(12) United States Patent
Sato

(10) Patent No.: US 9,200,942 B2
(45) Date of Patent: Dec. 1, 2015

(54) LIQUID CONSUMPTION DEVICE AND LIQUID RESIDUAL DETERMINATION METHOD

(71) Applicant: SEIKO EPSON CORPORATION, Tokyo (JP)

(72) Inventor: Jun Sato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 420 days.

(21) Appl. No.: 13/729,549

(22) Filed: Dec. 28, 2012

(65) Prior Publication Data

US 2013/0233047 A1    Sep. 12, 2013

(30) Foreign Application Priority Data

Mar. 12, 2012   (JP) .................................. 2012-054841

(51) Int. Cl.
| | |
|---|---|
| *G01F 19/00* | (2006.01) |
| *G01F 25/00* | (2006.01) |
| *G01F 23/292* | (2006.01) |
| *B41J 2/175* | (2006.01) |

(52) U.S. Cl.
CPC ........... *G01F 25/0076* (2013.01); *B41J 2/1752* (2013.01); *B41J 2/17546* (2013.01); *B41J 2/17553* (2013.01); *G01F 23/2922* (2013.01); *B41J 2002/17569* (2013.01); *B41J 2002/17573* (2013.01)

(58) Field of Classification Search
CPC ........................... G01F 25/0061; G01F 23/266
USPC .......................................................... 73/1.73
See application file for complete search history.

(56) References Cited

U.S. PATENT DOCUMENTS

| | | | |
|---|---|---|---|
| 2003/0025741 A1 | 2/2003 | Maeda | |
| 2003/0025742 A1 | 2/2003 | Maeda | |
| 2003/0136173 A1* | 7/2003 | Elenich et al. | 73/1.73 |

FOREIGN PATENT DOCUMENTS

| | | | |
|---|---|---|---|
| JP | 2003-039694 A | 2/2003 | |
| JP | 2003-039695 A | 2/2003 | |
| JP | 2004-284136 A | 10/2004 | |
| JP | 2006-082413 A | 3/2006 | |

* cited by examiner

*Primary Examiner* — Hezron E Williams
*Assistant Examiner* — Rodney T Frank
(74) *Attorney, Agent, or Firm* — Global IP Counselors, LLP

(57) ABSTRACT

A liquid consumption device includes a replaceable liquid container, a sensor, a fault finding section, an estimation section and a determination section. The sensor detects whether or not liquid has reached a predetermined amount. The fault finding section finds whether there is a fault in the sensor. The estimation section calculates an estimated value of a consumption amount of the liquid. The determination section carries out determination based on the estimated value of the liquid container and a threshold value which is specified based on threshold value information when a fault in the sensor has been found. The determination section carries out the determination based on the sensor when a fault in the sensor has not been found and to calculate the threshold value information based on the estimation value when the sensor detects that the liquid has reached the predetermined amount.

12 Claims, 18 Drawing Sheets

| Determination Method Switching Bit | Determination of Near-End if Ink |
|---|---|
| 0 | Sensor |
| 1 | Estimated Consumption Amount |

Fig. 8

| ITEMS | |
|---|---|
| Cyan C | Learned Sensor End Value |
| | Learned I/C Number |
| Magenta M | Learned Sensor End Value |
| | Learned I/C Number |
| Yellow Y | Learned Sensor End Value |
| | Learned I/C Number |
| Black K | Learned Sensor End Value |
| | Learned I/C Number |

Fig. 9

| IC Number | Ability to Use Sensor | Sensor End Amount | Learned Sensor End Value |
|---|---|---|---|
| First | Yes | E1 | C1 = E1 |
| Second | Yes | E2 | C2 = αE2+(1-α)C1 |
| Third | Yes | E3 | C3 = αE3+(1-α)C2 |
| ... | Yes | ... | ... |
| n$^{th}$ | Yes | En | Cn = αEn+(1-α)Cn-1 |
| (n+1)$^{th}$ | No | Cn | |
| ... | No | Cn | |

| INK CARTRIDGE | EFFECTIVE INK AMOUNT (g) | USE AMOUNT OF INK (g) AFTER NEAR-END OF INK | ESTIMATED CONSUMPTION AMOUNT (g) AT TIME OF END OF INK BEING DETERMINED USING SENSOR | ESTIMATED-CONSUMPTION AMOUNT DIFFERENCE PERCENTAGE (%) |
|---|---|---|---|---|
| ICc | 10 | 1 | 8.2 | 110 |
| ICd | 10 | 1 | 9.0 | 100 |
| ICe | 10 | 1 | 10.0 | 90 |

Fig. 12

| ITEMS | |
|---|---|
| CYAN C | LEARNED ESTIMATED CONSUMPTION AMOUNT DIFFERENCE PERCENTAGE |
| | LEARNED I/C NUMBER |
| MAGENTA M | LEARNED ESTIMATED CONSUMPTION AMOUNT DIFFERENCE PERCENTAGE |
| | LEARNED I/C NUMBER |
| YELLOW Y | LEARNED ESTIMATED CONSUMPTION AMOUNT DIFFERENCE PERCENTAGE |
| | LEARNED I/C NUMBER |
| BLACK K | LEARNED ESTIMATED CONSUMPTION AMOUNT DIFFERENCE PERCENTAGE |
| | LEARNED I/C NUMBER |

Fig. 14

| IC Number | Ability to Use Sensor | Sensor End Amount | Estimated Consumption Amount Difference Percentage DW | Learned Estimated Consumption Amount Difference Percentage ADW |
|---|---|---|---|---|
| First | Yes | E1 | DW1 | ADW1=DW1 |
| Second | Yes | E2 | DW2 | ADW2=(ADW1+DW2)/2 |
| Third | Yes | E3 | DW3 | ADW3=(2*ADW2+DW3)/3 |
| ... | Yes | ... | ... | ... |
| nth | Yes | En | DWn | ADWn=((n-1)*(ADWn-1)+DWn)/n |
| (n+1)th | No | Cn | ... | ... |
| ... | No | Cn | ... | ... |

Fig. 15

| ITEMS | |
|---|---|
| BLACK K | LEARNED ESTIMATED CONSUMPTION AMOUNT DIFFERENCE PERCENTAGE |
| | LEARNED I/C NUMBER |
| COLOR | LEARNED ESTIMATED CONSUMPTION AMOUNT DIFFERENCE PERCENTAGE |
| | LEARNED I/C NUMBER |

LIQUID CONSUMPTION DEVICE AND LIQUID RESIDUAL DETERMINATION METHOD

CROSS-REFERENCE TO RELATED APPLICATIONS

This application claims priority to Japanese Patent Application No. 2012-054841 filed on Mar. 12, 2012. The entire disclosure of Japanese Patent Application No. 2012-054841 is hereby incorporated herein by reference.

BACKGROUND

1. Technical Field

The present invention relates to a liquid consumption device and a liquid residual determination method.

2. Related Art

An ink cartridge which is a liquid container which is able to be removed is typically mounted in an ink jet printing device which is an example of a liquid consumption device. In order to detect that ink which is a liquid in the liquid container has fallen below a predetermined amount, for example, an optical sensor which is provided with a light emitting element and a light receiving element is provided in the vicinity of an ink chamber, light is incident with regard to a bottom surface of a prism (a surface which opposes the apex of the prism) which is provided in the ink cartridge, the intensity of light, which is reflected from the prism which changes according to the presence or absence of ink at the reflecting surface of the prism, is detected, and thus, there is a method (referred to below as a sensor method) where the presence or absence of ink at the reflecting surface of the prism is found. In addition, the ink consumption amount is estimated (referred to below as a dot counting method) by counting the number of discharges of ink droplets from a printing head and multiplying the ink amount per single discharge which is set in advance and the number of discharges. Furthermore, there is a technique (for example, Japanese Laid-Open Patent Application Publication No. 2003-39694 and Japanese Laid-Open Patent Application Publication No. 2003-39695) where the sensor method and the dot counting method are used together and the ink consumption amount which is calculated using the dot counting method is corrected according to the ink consumption amount which is detected using the sensor method However, in the technique which is described in the above described publications, there is a concern that it is not possible to detect when the ink is less than the predetermined amount with high accuracy as a result of it not being possible to correct the ink consumption amount which is calculated using the dot counting method in a case where a defect has occurred in the sensor. Such a problem is a problem which occurs in a similar manner in a case where a method where other various types of sensors are used and the dot counting method are used together without being limited to the sensor method where a prism is used.

SUMMARY

Considering the problems described above, the problem which the present invention intends to solve is to provide a technique where the ink falling below a predetermined amount is detected with high accuracy even in a case where it is not possible to detect that the ink has fallen below the predetermined amount using a sensor.

The present invention is able to address at least a portion of the problems described above and to be realized by the following modes or embodiments.

A liquid consumption device according to one aspect of the present invention includes a replaceable liquid container, a sensor, a fault finding section, an estimation section and a determination section. The sensor is configured to detect whether or not liquid in the liquid container has reached a predetermined amount. The fault finding section is configured to find whether there is a fault in the sensor. The estimation section is configured to calculate an estimated value of a consumption amount of the liquid in the liquid container. The determination section is configured to determine whether or not the liquid has reached the predetermined amount. The determination section is configured to carry out determination based on the estimated value of the liquid container which is currently mounted in the liquid consumption device and a threshold value which is specified based on threshold value information when a fault in the sensor has been found. The determination section is configured to carry out the determination based on the sensor when a fault in the sensor has not been found and to calculate the threshold value information based on the estimation value when the sensor detects that the liquid has reached the predetermined amount.

According to a configuration such as this, information for evaluating the threshold value (the threshold value information) is calculated based on the estimated value of the consumption amount of the liquid when the liquid has reached the predetermined amount when a fault in the sensor has not been found and it is possible to determine that the liquid has reached the predetermined amount based on the estimated value of the consumption amount of the liquid and the threshold value when a fault in the sensor has been found. Accordingly, it is possible to determine that the liquid has reached the predetermined amount with high accuracy even if the sensor is faulty.

The liquid consumption device according to the above described aspect, the threshold value information is preferably calculated based on a ratio of the estimated value when the sensor detects that the liquid in the liquid container has reached the predetermined amount and a theoretical value of the consumption amount of the liquid when the liquid in the liquid container has reached the predetermined amount.

According to a configuration such as this, it is possible for the threshold value to reflect the ratio of the estimated value when the sensor detects that the liquid in the liquid container has reached the predetermined amount and the consumption amount (the theoretical value) of the liquid when the liquid in the liquid container has reached the predetermined amount. As a result, it is possible to determine that the liquid has reached the predetermined amount with high accuracy even if the sensor is faulty and it is possible to correctly estimate the liquid amount which is able to be used after the liquid has reached the predetermined amount.

The liquid consumption device according to the above described aspect, the determination section is preferably configured to evaluate a statistical value of the ratio as the threshold value information, and the determination section is preferably configured to set a value, where the theoretical value of the consumption amount of the liquid when the liquid has reached the predetermined amount is divided by the threshold value information, as the threshold value when a fault in the sensor has been detected.

According to a configuration such as this, it is possible for the threshold value to reflect a trend in the ratio of the estimated value when the sensor detects that the liquid in the liquid container has reached the predetermined amount and the consumption amount (the theoretical value) of the liquid when the liquid in the liquid container has reached the predetermined amount. As a result, it is possible to determine that the liquid has reached the predetermined amount with higher accuracy even if the sensor is faulty and it is possible to more correctly estimate the liquid amount which is able to be used after the liquid has reached the predetermined amount.

The liquid consumption device according to the above described aspect, in a case where the liquid container is replaceable with liquid containers having different capacities, and the liquid container with a different capacity from a reference liquid container is currently mounted in the liquid consumption device, the determination section is preferably configured to carry out the determination when a fault in the sensor has been found based on the threshold value and the estimated value of the liquid container with the different capacity by calculating the threshold value which is applied to the liquid container with the different capacity based on a ratio of a theoretical value of the consumption amount of the liquid, when the liquid in the liquid container with the different capacity has reached the predetermined amount, and a theoretical value of the consumption amount of the liquid, when the liquid in the reference liquid container has reached the predetermined amount, and threshold value information of the reference liquid container. The determination section is preferably configured to carry out the determination based on the sensor when a fault in the sensor has not been found and to calculate the threshold value information of the reference liquid container based on the estimated value when the sensor detects that the liquid in the liquid container with the different capacity has reached the predetermined amount and the ratio of the theoretical value of the consumption amount of the liquid, when the liquid in the liquid container with the different capacity has reached the predetermined amount, and the theoretical value of the consumption amount of the liquid, when the liquid in the reference liquid container has reached the predetermined amount.

According to a configuration such as this, when a fault in the sensor has been found, it is possible to determine that the liquid has reached the predetermined amount when the estimated value of the liquid container with the different capacity has reached the threshold value which is applied to the liquid container with the different capacity even when the liquid container with the different capacity to the reference liquid container is mounted. Accordingly, determination is possible based on the same threshold value information even when the amount contained in the liquid container is different. In addition, when a fault in the sensor has not been found, it is possible to calculate the threshold value information of the reference liquid container based on the ratio of the theoretical values of the reference liquid container and the liquid container with the different capacity and the estimated value of the consumption amount of the liquid when it is detected that the liquid in the liquid container with the different capacity has reached the predetermined amount based on the sensor. Accordingly, since there is no need to calculate and update the threshold value information for each of the containment amounts in the liquid containers, it is possible to increase the frequency of updating the threshold value information and determine that the liquid has reached the predetermined amount with high accuracy The liquid consumption device according to the above described aspect, in a case where the liquid container with the different capacity is currently mounted in the liquid consumption device, the determination section is preferably configured to evaluate, as the threshold value information, a statistical value of a value where a correction value, where the theoretical value of the consumption amount of the liquid when the liquid in the reference liquid container has reached the predetermined amount is divided by the theoretical value of the consumption amount of the liquid when the liquid on the liquid container with the different capacity has reached the predetermined amount, is multiplied with the estimated value when the sensor detects that the liquid in the liquid container with the different capacity has reached the predetermined amount and the estimated value when the sensor detects that the liquid in the reference liquid container has reached the predetermined amount. The determination section is preferably configured to set the value where the threshold value information is divided by the correction amount as the threshold value when a fault in the sensor has been found.

According to a configuration such as this, since there is evaluation as the threshold value information of a statistical value of a value where the correction value is multiplied with the estimated value when the sensor detects that the liquid in the liquid container with the different capacity has reached the predetermined amount and the estimated value when the sensor detects that the liquid in the reference liquid container has reached the predetermined amount, it is possible for the threshold value to reflect a trend in the estimated value when the sensor detects that the liquid in the liquid container has reached the predetermined amount irrespective of the containment of the liquid container.

The liquid consumption device according to the above described aspect, the determination section is preferably configured to evaluate a statistical value of the estimated value when the sensor detects that the liquid has reached the predetermined amount as the threshold value information, and the determination section is preferably configured to set the same value as the threshold value information as the threshold value when a fault in the sensor has been found.

According to a configuration such as this, it is possible for the threshold value to reflect a trend in the estimated value when the sensor detects that the liquid in the liquid container has reached the predetermined amount since a statistical value of the estimated value when the sensor detects that the liquid in the liquid container has reached the predetermined amount is evaluated as the threshold value information.

The liquid consumption device according to the above described aspect, the statistical value is preferably calculated using a weighted averaging method and giving the largest weighting for a value which is most recently added.

According to a configuration such as this, since the weighting of the value, which is added in order to calculate the statistical value immediately previous to the fault in the sensor, has the largest weighting, it is possible to determine when the liquid has reached the predetermined amount by the immediately previous consumption circumstances of the liquid in the liquid consumption device being reflected to the uttermost.

The liquid consumption device according to the above described aspect, a plurality of the liquid containers is preferably provided, and the determination section is preferably configured to calculate the threshold value information for each of the liquid containers.

According to a configuration such as this, it is possible to determine when the liquid has reached the predetermined amount with high accuracy for each of the liquid containers even when the sensor is faulty.

The liquid consumption device according to the above described aspect, the liquid container is preferably replaceable with liquid containers with different capacities, and the determination section is preferably configured to calculate the threshold value information for each of the liquid containers with different capacities.

According to a configuration such as this, it is possible to determine that the liquid has reached the predetermined amount with high accuracy using the threshold value information which corresponds to each of the liquid containers even if the capacities of the liquid containers are different.

The liquid consumption device according to the above described aspect, the determination section is preferably configured to carry out the determination based on the estimated value and the threshold value when the threshold value information is calculated a predetermined number of times or more.

According to a configuration such as this, it is possible to determine that the liquid has reached the predetermined amount with high accuracy based on the threshold value with high reliability even if the sensor is faulty.

In addition to the configuration as a liquid consumption device described above, it is possible for the present invention to also be configured as a liquid residual determination method or as a computer program. The computer program may also be recorded on a computer readable recording medium. As the recordable medium, for example, it is possible to use various media such as a flexible disc, a CD-ROM, a DVD-ROM, an optical magnetic disc, a memory card, or a hard disk.

BRIEF DESCRIPTION OF THE DRAWINGS

Referring now to the attached drawings which form a part of this original disclosure:

FIG. 8 is a view illustrating an ink near-end determination method switching bit and an ink near-end determination process.

FIG. 9 is a view illustrating an example of data which is stored in an EEPROM.

FIG. 10 is a view for describing a specific example of learning in step S40.

FIG. 12 is a view for describing an estimated consumption amount difference percentage.

FIG. 14 is a view illustrating an example of data which is stored in an EEPROM.

FIG. 15 is a view for describing a specific example of learning in step S45.

DETAILED DESCRIPTION OF EXEMPLARY EMBODIMENTS

A. First Embodiment

A-1. Configuration of Printing Device

Figure 1:
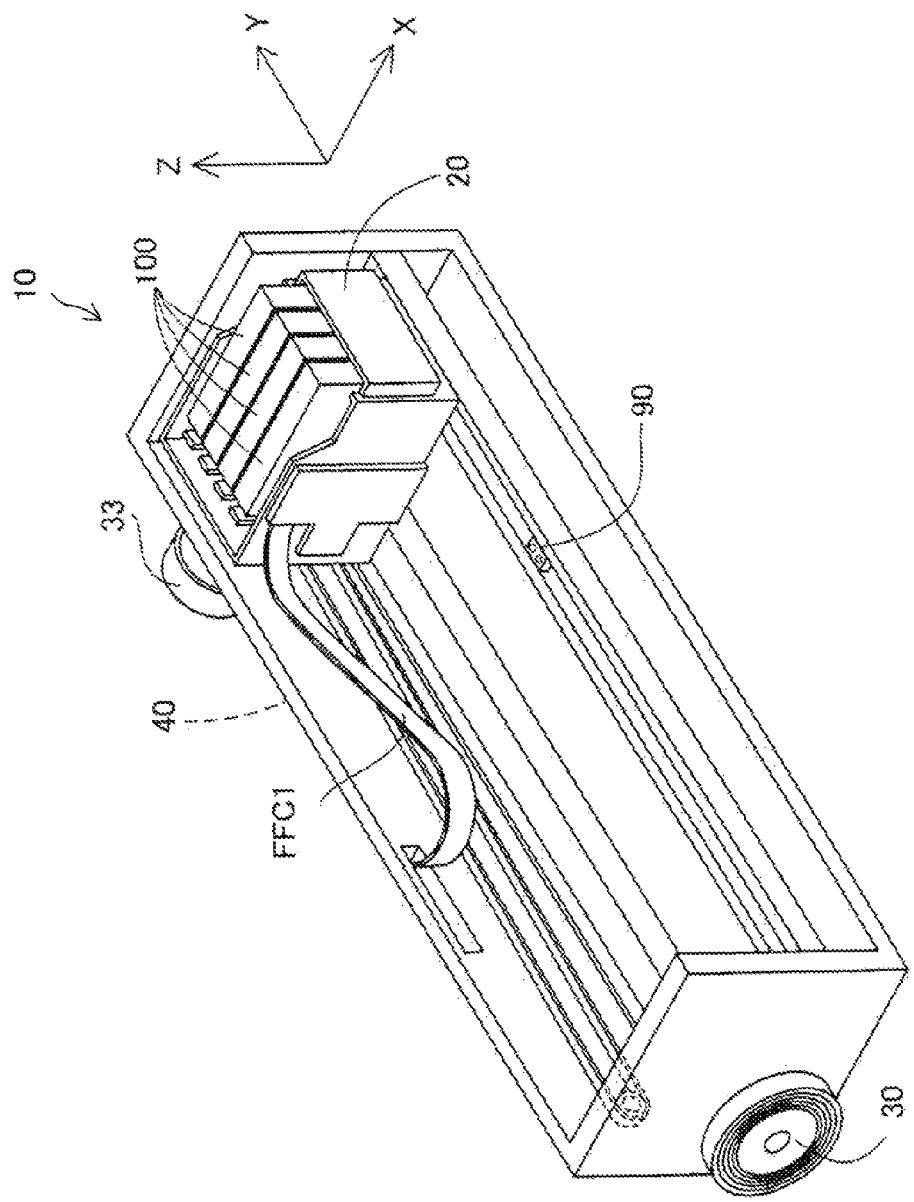
FIG. 1 is a perspective view illustrating the major parts of a printing device as a first embodiment of the present invention.
Figure 2:
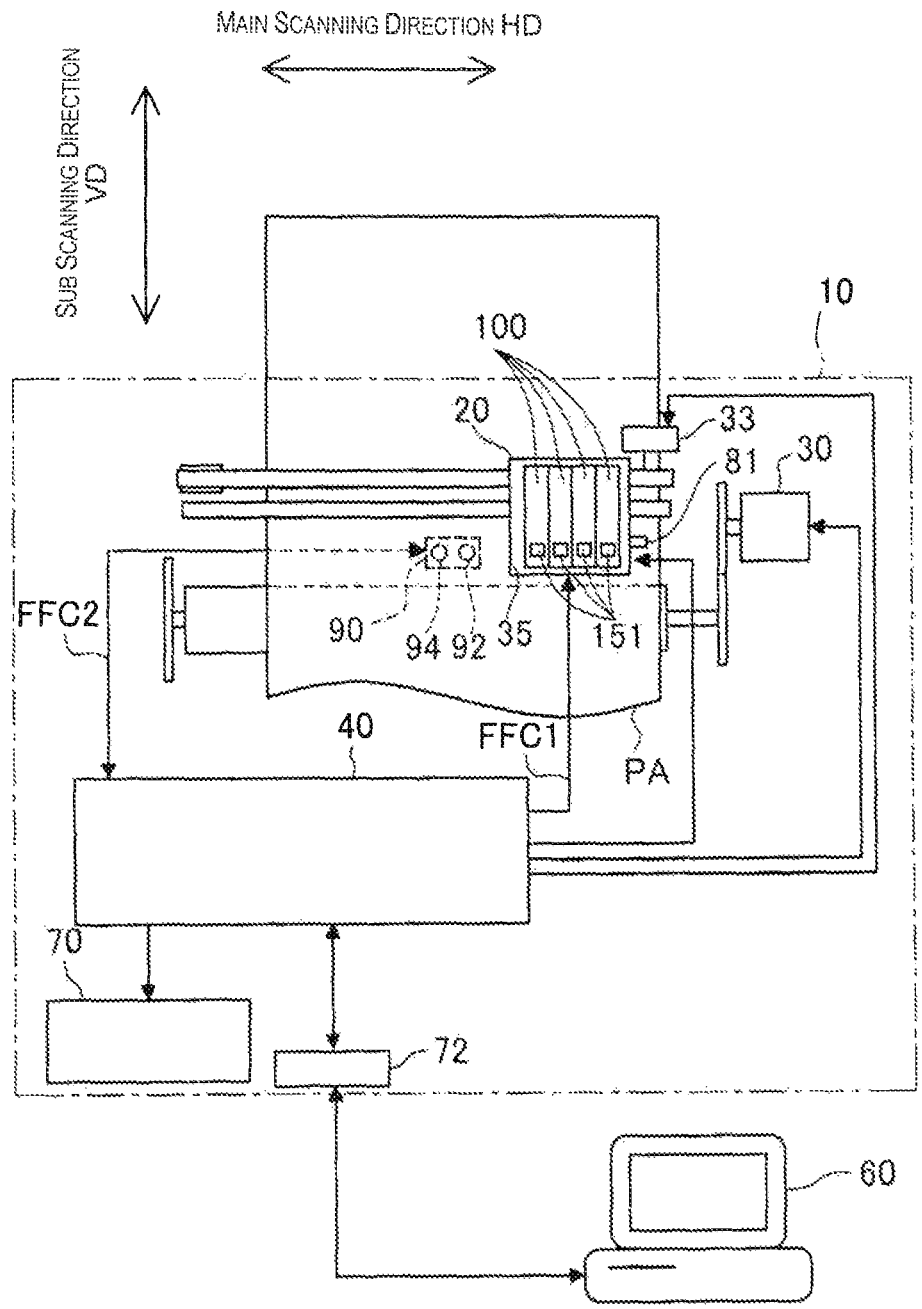
FIG. 2 is a schematic configuration diagram of a printing device.

FIG. 1 is a perspective view illustrating the major parts of a printing device 10 as a first embodiment of the present invention. FIG. 2 is a schematic configuration diagram of the printing device 10. The printing device 10 is mounted with an ink cartridge 100 which is an example of an ink material cartridge so that exchanging is possible and executes printing using ink in the ink cartridge 100. The printing device 10 is a printing device which determines whether or not the residual amount of ink in the ink cartridge 100 has reached a predetermined amount using a sensor method and a dot counting method together.

X, Y, and Z axes are drawn to be orthogonal to each other in FIG. 1. In the embodiment, in the usage posture of the printing device 10, the Z axial direction is the vertical direction and the surface in the X axial direction of the printing device 10 is a front surface. The main scanning direction of the printing device 10 is the Y axial direction and the sub scanning direction is the X axial direction. The printing device 10 as a liquid consumption device is provided with a carriage 20 which is mounted with an ink cartridge 100, which contains one of each the colors of ink such as cyan C, magenta M, yellow Y, and black B, and which are provided with a fault finding plate 81, a carriage motor 33 which drives the carriage 20 in a main scanning direction HD, a sensor 90, which is disposed in parallel with the main scanning direction HD of the carriage 20, for detecting whether or not the ink in the ink cartridge 100 has reached the predetermined amount, a paper feeding motor 30 which transports a printing medium PA in a sub scanning direction VD, a printing head 35 which is mounted in the carriage 20 and discharges the ink which is supplied from the ink cartridge 100, and a control section 40 which performs printing by controlling the cartridge motor 33, the paper feeding motor 30, and the printing head 35 based on the printing data which is received from a computer 60 which is connected via a predetermined interface 72. A display panel 70 which displays an operation state of the printing device 10 or the like is connected to the control section 40. In addition, a carriage 20 is connected to the control section 40 using a cable FFC 1 and the sensor 90 is connected to the control section 40 using a cable FFC 2.

The sensor 90 is provided with a light emitting element 92 and a light receiving element 94. The sensor 90 is configured by a reflection type photo interrupter. The sensor 90 is provided with, for example, an LED as the light emitting element 92 and, for example, a phototransistor as the light receiving element 94. The light receiving element 92 of the sensor 90 emits light due to control from the control section 40. The control section 40 controls so that the light emitting element of the sensor 90 flashes with pulses and adjusts the light emission amount by adjusting the duty ratio (ratio of on time and off time) of a PWM (Pulse Width Modulation) signal. The light which is emitted from the LED is incident on the phototransistor by being reflected by a prism in the ink cartridge 100 which will be described later.

The light emitting element 92 and the light receiving element 94 of the sensor 90 are disposed to line up parallel with the main scanning direction HD of the carriage 20 (FIG. 2). In addition, the sensor 90 is disposed so oppose a prism 170 in the ink cartridge 100 when the carriage 20 which moves due to the driving of the carriage motor 33 is disposed above the sensor 90.

Figure 3:
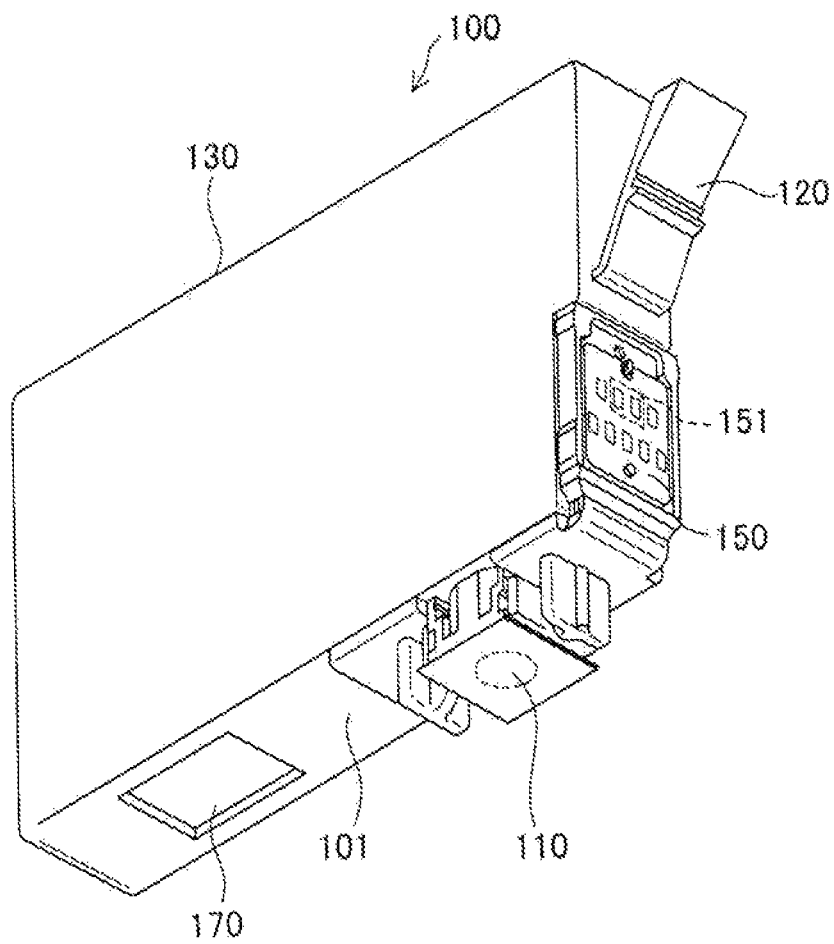
FIG. 3 is a perspective view of an ink cartridge.

FIG. 3 is a perspective view of the ink cartridge 100. The ink cartridge 100 is provided with an ink containing section 130 with substantially a rectangular shape which contains ink as a liquid and a lever 120 for attaching and detaching the ink cartridge 100 from the carriage 20. When the ink cartridge 100 is mounted in the carriage 20, an ink supply port 110 where an ink supply needle (not shown) provided in the carriage 20 is inserted is formed on a bottom surface 101 of the ink cartridge 100. In a state before usage, an opening in the ink supply port 110 is sealed using a film. When the ink cartridge 100 is mounted in the carriage 20 from above, supply of the ink from the ink cartridge 100 to the printing head 35 is possible. Positions in the ink containing section 130 where the ink of each color is mounted are specified for each color.

A substrate 150, where a memory 151 which stores information relating to the ink cartridge 100 is loaded onto the rear surface thereof, is provided in the ink cartridge 100. The information relating to the ink cartridge 100 is an estimated consumption amount, an effective ink amount, ink near-end determination information on whether or not the near-end of the ink is detected by the sensor, an estimated consumption amount at a time of near-end ink in a case where the near-end of the ink is detected by the sensor, and the like which will be described later. The details of this information will be described later. Hereinafter, the information relating to the ink cartridge 100 is referred to as "ink cartridge information". A terminal which is electrically connected to the memory 151 is provided on a surface of the substrate 150 which opposes the carriage 20, and the control section 40 is in a state where accessing of the memory 151 is possible via the terminal when the ink cartridge 100 is mounted in the carriage 20. By doing this, the control section 40 executes the reading and writing of the ink cartridge information with regard to the memory 151.

Figure 4:
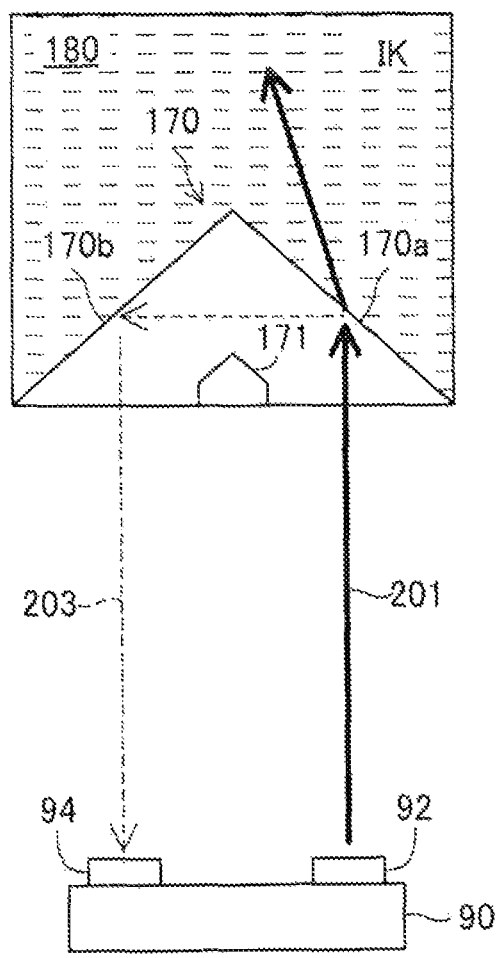
FIG. 4 is a view illustrating schematics of a prism which is disposed at an inner portion of an ink containing section.

FIG. 4 is a view illustrating schematics of the prism which is disposed in the ink containing section 130. The prism 170 with a shape of an isosceles right angled triangle is disposed in the lower portion of the inner portion of the ink containing section 130 (a portion in the −Z direction). The prism 170 emits light which is incident toward the light receiving element 94 according to the residual amount of ink IK in the ink containing section 130 in a case where light 201 which is radiated from the light emitting element 92 is incident on the bottom surface of the prism 170. Specifically, in a case where the ink IK exists in the ink containing section 130 to an extent where the reflecting surface, where light from the light emitting element 92 is incident, of an inclined surface 170a which is formed at the apex of the prism 170 is in contact with the ink when the apex of the prism 170 and the center of the light emitting center and the light receiving center of the sensor 90 substantially match, the substantive portion of the light which is radiated from the light emitting element 92 is refracted by the inclined surface 170a and absorbed by the ink IK as with the light path which is shown by the solid line in FIG. 4. This is because the refractive indexes of the prism 170 and the ink IK are different. On the other hand, in a case where the reflecting portion of the inclined surface 170a which is formed at the apex of the prism 170 and a portion which receives the incidence of light at an inclined surface 170b which receives light which is reflected by the inclined surface 170a (the portions out of the inclined surfaces which contribute to the reflection of light) are in contact with air, that is, in a case where the amount of ink IK is low, the light which is radiated toward the bottom surface of the prism 170 from the light emitting element 92 which is provided in the sensor 90 is reflected completely twice in the prism 170 as with the light path which is shown by the dashed line in FIG. 4 due to the difference in the refractive index of the prism 170 and air. By doing this, the progression direction of the light which is incident from the light emitting element 92 is reversed by 180° and is emitted to the light receiving element 94.

Figure 5:
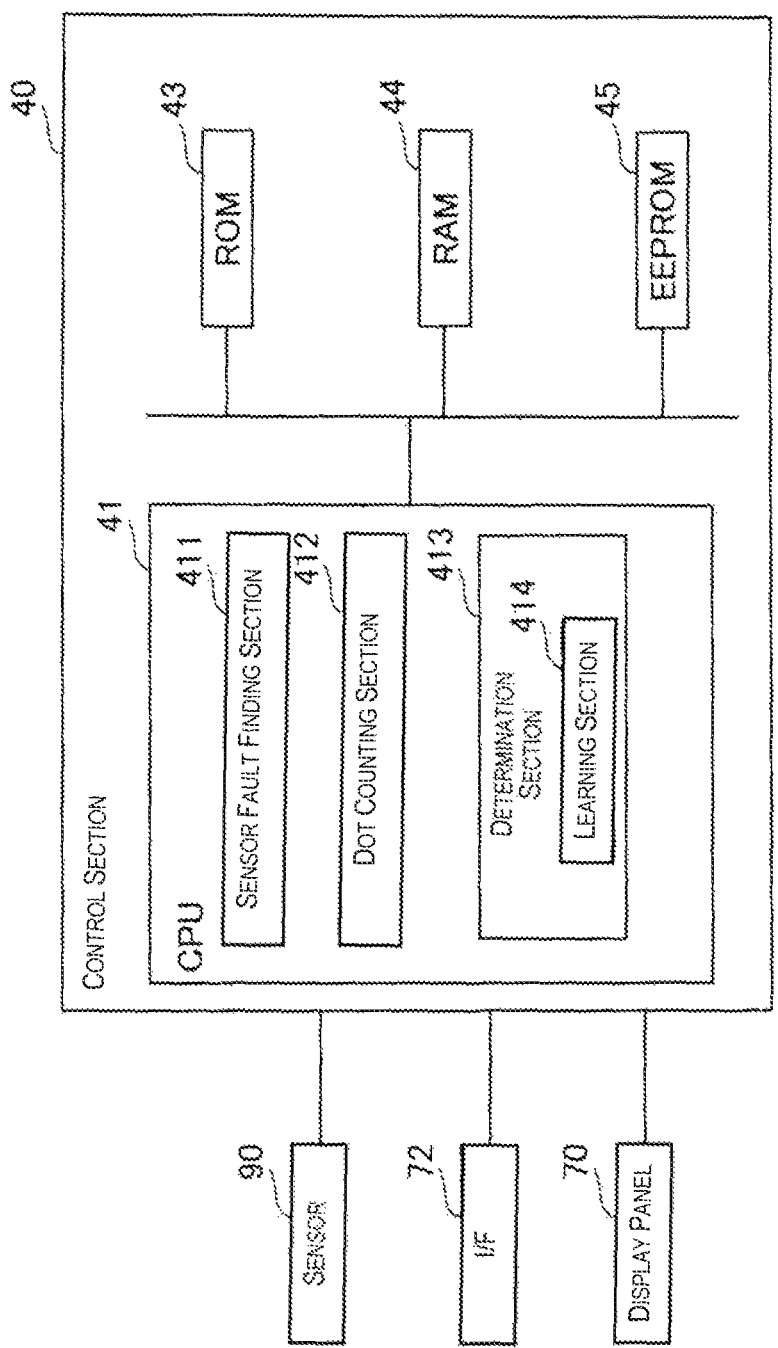
FIG. 5 is a view illustrating the configuration of a control section.

FIG. 5 is a view illustrating the configuration of the control section 40. The control section 40 is configured by a CPU 41, a ROM 43, a RAM 44, and an EEPROM 45. By executing a control program which is stored in advance in the ROM 43 using development in the RAM 44, the CPU 41 function as a sensor fault finding section 411, a dot counting section 412, a determination section 413 which determines that it is the near-end of the ink and the end of the ink which will be described later, and a learning section 414 which learns by calculating a learned sensor end value and a learned estimated consumption amount difference percentage which will be described later. In addition, the CPU 41 performs a printing process and a control process of the printing device 10 by executing a control program which is stored in the ROM 43 for overall control of the operations of the printing device 10 using development in the RAM 44. The printing process is a process where raster data, which indicates the forming (on) or non-forming (off) of dots in the main scanning direction HD with which the printing head 35 moves, is generated by the CPU 41 based on image data and a dot pattern which represents an image or text is formed by discharging ink droplets to desired positions on the printing medium PA by driving the carriage 20, the printing head 35, and the paper feeding motor 30 based on the raster data which has been generated. In addition, the estimated consumption amount of ink in each of the ink cartridges which will be described later is temporarily stored in the RAM 44 while the power source of the RAM 44 is being maintained. Here, the estimated consumption amount is stored for each ink cartridge in the EEPROM 45 and the memory 151 which is provided in the ink cartridge 100 while the power source of the printing device 10 is not turned on. In addition, the EEPROM 45 stores information which relates to the learned sensor end value, the learned estimated consumption amount difference percentage, a learned ink cartridge number (learned I/C number), and a determination method switching bit which will be described later. In the embodiment, the learned sensor end value is equivalent to "threshold value" which is decided upon based on "threshold value information" of the claims. Here, in the embodiment, the value of the threshold value information and the threshold value is the same.

The dot counting section 412 is a functional section which estimates the amount of ink which has been consumed for each of the ink cartridges due to a printing process, periodic ink discharge for maintaining the printing head 35 in an appropriate state (flushing), and a process for cleaning the printing head 35 (referred to below as a printing process and the like). Below, the ink consumption amount which is estimated is referred to as the "estimated consumption amount (estimated value)". The estimated consumption amount is the amount of the ink in the ink cartridge which is consumed due to dot counting and it is possible to be expressed as a ratio with regard to the effective ink amount which will be described later. The dot counting section 412 calculates the ink consumption amount by multiplying the number of discharges of ink which is discharged in the printing process and the like with the mass amount in the units of ink droplets. Then, the cumulative total of the consumption amount, which is estimated, is calculated from the start of the usage of each of the ink cartridges. Ink which is consumed due to flushing or cleaning of the printing head 35 is also included in the cumulative total. The dot counting section 412 is equivalent to the "estimation section" of the claims.

The sensor fault finding section 411 is a functional section which gauges whether or not the sensor 90 is operating normally. In the specifications, a fault in the sensor 90 refers to a case where it is not possible to detect the near-end of the ink (which will be described later) or the end of the ink (which will be described later) by using the sensor 90. Accordingly, the "fault in the sensor" in the claims is equivalent to not only cases where there is an abnormality in the electrical circuitry of the sensor 90 but also cases where it is not possible for the light receiving element 94 to sufficiently receive light due to not being clean due to ink mist although it is possible for the sensor 90 to normally perform emitting of light and receiving of light. The sensor fault finding section 411 finds faults in the sensor 90 after, for example, the carriage 20 is moved so that the fault finding plate 81 opposes the sensor 90 prior to the timing where the determination section 413 gauges whether or not the ink amount has reached the predetermined amount. A specific method for finding faults will be described later. The sensor fault finding section 411 is equivalent to the "fault finding section" in the claims.

The determination section 413 is a functional section which gauges whether or not the amount of ink in the ink cartridge 100 has reached the predetermined amount. Hereinafter, the residual amount of the ink in the ink cartridge 100 reaching the predetermined amount is referred to as "near-end of the ink". Then, a state, where the predetermined amount of the ink has been consumed since the near-end of the ink was detected, is referred to as "end of the ink". The determination section 413 determines that it is the near-end of the ink based on the output from the sensor 90 when the sensor fault finding section 411 does not find a fault in the sensor 90. As is described using FIG. 4, the amount of light, which is incident on the light receiving element 94 which is provided in the sensor 90, is low when the amount of the ink IK in the ink containing section 130 is sufficient. Then, the amount of light, which is incident on the light receiving element 94, is high when the reflection portions of the inclined surfaces 170a and 170b of the prism 170 are in contact with air. The amount of light is output to the control section 40 by being converted into a voltage value in the embodiment. In the embodiment, the voltage value is set to be lower as the amount of light is higher. The determination section 413 acquires the voltage value based on the light which is incident on the phototransistor via the cable FFC 2 and the near-end of the ink is determined when the voltage value which has been acquired is lower than the voltage value which corresponds to the residual amount of ink which is set in advance. Hereinafter, the determination of the near-end of the ink based on the output from the sensor 90 is referred to as "the end of the ink being determined using the sensor". In addition, the near-end of the ink is determined by the determination section 413 based on the learned sensor end value and the estimated consumption amount which will be described later when the sensor fault finding section 411 has found a fault in the sensor 90.

Figure 6:
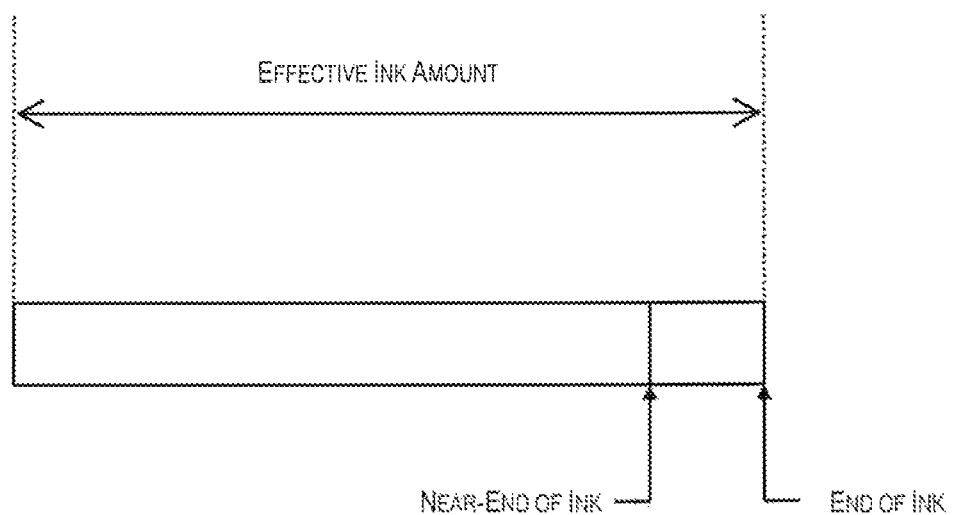
FIG. 6 is a view for describing an effective ink amount.

FIG. 6 is a view for describing the effective ink amount. The effective ink amount refers to an amount which is set in advance as an amount of ink in the ink cartridge 100 where it is possible to appropriately perform the printing process and the like in the printing device 10. Specifically, the effective ink amount is the amount of ink in the ink cartridge which is consumed in a case where the printing device 10 is used in a standard format under a standard environment. That is, the total of the amount of ink, which is consumed using the printing device 10 in the standard format under the standard environment in a case where the ink consumption amount which is estimated using dot counting has reached the predetermined amount after the near-end of the ink has been detected using the sensor 90, is the effective ink amount. The effective ink amount is set in advance for each type such as color of ink which is contained in the ink cartridge 100 and ink containment amount (capacity) which is able to be contained. The differences in the amount of ink in the ink cartridge which is consumed are shown in FIG. 6 when the end of the ink or it is determined that it is the end of the ink based on the differences in the units of printing devices, the standard environment, and the like.

In a case where it is not possible for the determination section 413 to determine that it is the near-end of the ink based on the output of the sensor 90 when the sensor 90 is faulty or the like, it is gauged that the near-end of the ink has been reached in a case where the estimated consumption amount, which is estimated using by the dot counting section 412, has reached the learned sensor end value which is stored in the EEPROM 45. When the determination section 413 gauges that the near-end of the ink has been reached, the CPU 41 displays information which prompts the exchanging of the ink cartridge 100 on the display panel 70 which is connected to the control section 40 or a display screen of the computer 60 which is connected to the printing device 10 via the interface 72.

In addition, the determination section 413 determines that it is the end of the ink in a case where it is gauged that the estimated consumption amount from the dot counting section 412 has reached the ink consumption amount which is set in advance after the near-end of the ink (the end of the ink is determined using the sensor) has been detected. In the embodiment, the end of the ink is determined in a case where it is gauged that the amount of ink which is consumed from the time of the near-end of the ink which is estimated by the dot counting section has reached the amount which is set in advance, but this is one format, and for example, the end of the ink may be determined when the near-end of the ink has been reached.

The learning section 414 which is provided in the determination section 413 calculates the learned sensor end value from the estimated consumption amount at a time when it is determined that it is the near-end of the ink based on the output from the sensor 90 using a calculation method which will be described later. The learning section 414 updates the learned sensor end value which is stored in the EEPROM 45 when the learned sensor end value is calculated.

A-2 Printing Process Including Ink Near-End Determination Process

Figure 7:
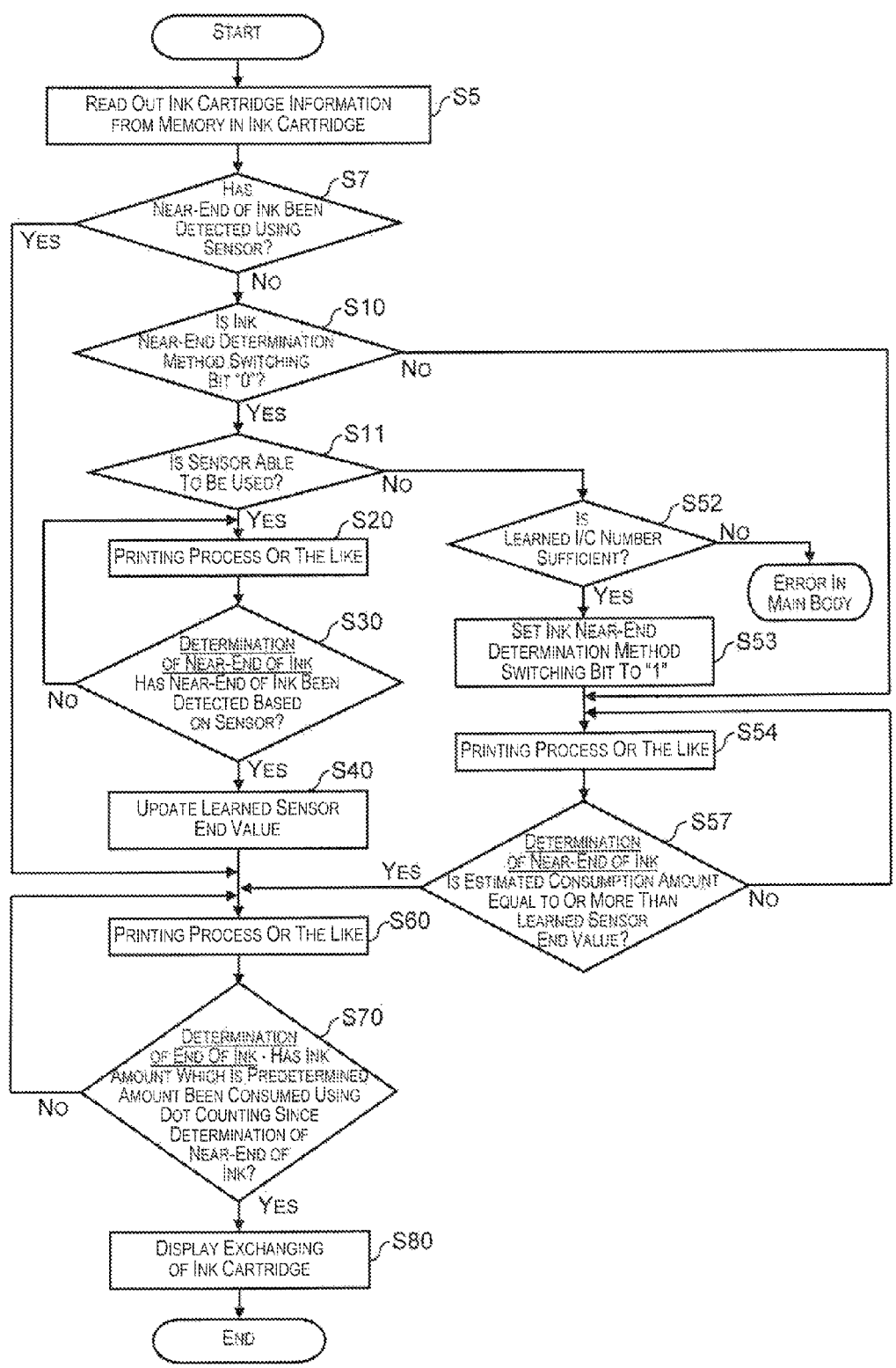
FIG. 7 is a flow chart of a printing process which includes an ink near-end determination process.

FIG. 7 is a flow chart of the printing process which includes the ink near-end determination process executed by the control section 40. The flow chart which is shown in FIG. 7 is executed after the power source of the printing device 10 is turned on, after exchanging of the ink cartridge 100, or the like. In the embodiment, the ink cartridge 100 uses four types of the ink cartridges 100 of cyan C, magenta M, yellow Y, and black K. In addition, the ink cartridges 100 of the same color which are mounted in the printing device 10 are exchanged with the ink cartridges 100 with the same effective ink amount. Here, all of or a portion of the printing process which includes the ink near-end determination process shown in FIG. 7 may be repeatedly executed within a range where there are no inconsistencies.

The CPU 41 reads out the ink cartridge information which is stored in the memory 151 provided in each of the ink cartridges 100 when the power source of the printing device 10 is turned on or the ink cartridge 100 is exchanged and the ink cartridge information is stored in the RAM 44 (step S5).

It is gauged whether or not the near-end of the ink has already been detected in the ink cartridge 100 by the sensor 90 based on ink near-end determination information which is included in the ink cartridge information when the CPU 41 reads out the ink cartridge information from the memory 151 in the ink cartridge 100 (step S7).

In the ink cartridge 100, in a case where the near-end of the ink was not detected by the sensor 90 (step S7: No), the CPU 41 gauges whether or not the ink near-end determination method switching bit in the EEPROM 45 is "0" (step S10).

FIG. 8 is a view illustrating the ink near-end determination method switching bit and the ink near-end determination process. The ink near-end determination method switching bit is a bit for switching the gauging of whether or not the near-end of the ink has been reached to either being performed based on the output from the sensor 90 or being performed based on the learned sensor end value which will be described later. If the ink near-end determination method switching bit is "0", the determination section 413 determines that it is the near-end of the ink based on the output from the sensor 90. On the other hand, if the ink near-end determination method switching bit is "1", the determination section 413 determines that it is the near-end of the ink based on the learned sensor end value which will be described later and the estimated consumption amount which is estimated by the dot counting section 412.

When the ink near-end determination method switching bit is "0" (step S10: Yes), the sensor fault finding section 411 gauges whether or not it is possible to determine that it is the near-end of the ink using the sensor 90 (step S11). In the embodiment, specifically, the sensor fault finding section 411 moves the carriage 20 so that the fault finding plate 81 is positioned directly above the sensor 90 at a predetermined timing. The fault finding plate 81 is configured by a mirror which completely reflects light. A portion of the light which is radiated from the light emitting element 92 to the fault finding plate 81 is incident on the light receiving element 94 by being reflected by the mirror surface of the fault finding plate 81. The sensor fault finding section 411 gauges that the sensor 90 is able to be used in a case where the amount of light which is incident on the light receiving element 94 by being reflected by the mirror surface of the fault finding plate 81 within a range of the amount of light which is set in advance (step S11: Yes). In the embodiment, the amount of light is converted to a voltage value. The sensor fault finding section 411 gauges that, for example, sufficient receiving of light is not possible since the light receiving element 94 is not clean due to ink mist in a case where the voltage value based on the amount of light which is incident on the light receiving element 94 is larger than a voltage value which is set in advance. In addition, it is gauged that, for example, an abnormality has occurred in the electrical circuitry of the sensor 90 in a case where the voltage value based on the amount of light which is incident on the light receiving element 94 is smaller than the voltage value which is set in advance. In this case, the sensor fault finding section 411 gauges that the sensor 90 is not able to be used (step S11: No). In this case, the sensor fault finding section 411 may display information which prompts repair-ing of the sensor 90 or cleaning of the fault finding plate 81 on the display panel 70 which is connected to the control section 40 or the display screen of the computer 60 which is connected to the printing device 10 via the interface 72. Here, in the processing of step S11, it is common processing for all of the ink cartridges which are mounted in the printing device 10 but other processing is processing which is for each individual ink cartridge. When No is gauged in step S11, hereinafter, the processing from step S52 to step S80 is performed with regard to all of the ink cartridges which are currently mounted in the printing device 10.

When it is gauged that it is possible for the near-end of the ink to be determined using the sensor 90 (step S11: Yes), the CPU 41 carries out a printing process, flushing, or a process for cleaning the printing head 35 according to an instruction from a user or a computer and the like (step S20). The dot counting section 412 calculates the estimated consumption amount based on the number of discharges of ink droplets due to the printing process, the flushing, or the process for cleaning the printing head 35. The CPU 41 updates the estimated consumption amount which is stored in the RAM 44 with the estimated consumption amount which has been calculated.

The determination section 413 gauges whether or not the amount of ink is at the near-end of the ink with regard to each of the ink cartridges 100 based on the voltage value of the sensor 90 at a time when the carriage 20 is moved above the sensor 90 at, for example, a timing where the printing to the printing medium PA has been completed or a predetermined timing such as during execution of a printing process or the like. In a case where the determination section 413 does not detect the near-end of the ink (step S30: No), the printing process, the flushing, or the process for cleaning the printing head 35 in step S20 described above are subsequently executed.

When the determination section 413 detects the near-end of the ink based on the output from the sensor 90 (step S30: Yes), the learning section 414 calculates a learned sensor end value Cn using the formula (1) below from an estimated consumption amount En at a time when the determination section 413 detects the near-end of the ink.

Formula (1)

$$C_n = \alpha E_n + (1-\alpha)C_{n-1} \quad (1)$$

The learned sensor end value Cn is a statistical value of the estimated consumption amount which is calculated on the basis of the estimated consumption amount En when the sensor 90 has detected the near-end of the ink in the ink cartridge for the nth time and a learned sensor end value Cn−1 when the sensor 90 has detected the near-end of the ink for the n−1th time. Here, a coefficient $\alpha$ which is multiplied with the learned sensor end value Cn is such that $0 \leq \alpha \leq 1$ and $\alpha = 0.6$ is adopted in the embodiment. The learned sensor end value Cn which is calculated using formula (1) is a value which most reflects the estimated consumption amount when the sensor has detected the near-end of the ink for the nth time since the "En", which is the estimated consumption amount when the determination section 413 immediately previously detected the near-end of the ink, is directly multiplied with $\alpha$. That is, when the ink cartridge which is currently mounted in the printing device 10 is the nth ink cartridge and the sensor 90 has detected the near-end of the ink in the ink cartridge, the learned sensor end value Cn is a value which most reflects the estimated consumption amount En of the ink cartridge which is currently mounted in the printing device 10. Here, a learned sensor end value C1 is equal to the estimated consumption amount E1 when the sensor has detected the near-end of the ink for the first time. A specific example of the learning will be described later.

The learning section 414 updates the learned sensor end value "Cn−1" which is stored in the EEPROM 45 to the learned sensor end value "Cn" which has been newly calculated when the learned sensor end value is calculated (step S40). In addition, the CPU 41 updates the accumulated value of the individual numbers of the ink cartridges which are targets for the calculation of the learned sensor end value (learned I/C number) which is stored in the EEPROM 45 when the learned sensor end value is updated. In the embodiment, the learned sensor end value Cn and the learned I/C number are stored for each color of ink in the ink cartridge 100.

The CPU 41 subsequently performs the printing process, the flushing, or the process for cleaning the printing head 35 according to an instruction from the user or the computer in the same manner as step S20 even after the determination section 413 has detected the near-end of the ink (step S60). The CPU 41 stores the ink near-end determination information which indicates that the near-end of the ink has been detected by the sensor 90 and the estimated consumption amount when at the near-end of the ink in the memory 151 of the ink cartridge 100 at a predetermined timing between step S30 and step S60.

Next, the determination section 413 determines whether or not the amount of ink which is the predetermined amount has been consumed since when the near-end of the ink was determined using dot counting or whether or not the end of the ink has been reached (step S70).

When the determination section 413 determines that it is the end of the ink (step S70: Yes), the CPU 41 instructs the display of information which requests the exchanging of the ink cartridge 100 on the display panel 70 which is connected to the control section 40 or the display screen of the computer 60 which is connected to the printing device 10 via the interface 72 (step S80). In a case where the determination section 413 does not determine that it is the end of the ink (step S70: No), the process returns to step S60 and the printing process, the flushing, or the process for cleaning the printing head 35 described above are subsequently performed.

In a case where the sensor fault finding section 411 gauges that the sensor 90 is not able to be used in step S11 (step S11: No), it is not possible for the determination section 413 to detect the near-end of the ink based on the output from the sensor 90. Therefore, the determination section 413 determines that it is the near-end of the ink based on the learned sensor end value. In order to achieve this, the CPU 41 first gauges whether or not the learned I/C number which is stored in the EEPROM 45 is a predetermined value or more (step S52). It is possible for the predetermined value of the learned I/C number to be arbitrarily set but is normally set to a value where a fault does not occur in the sensor 90 due to the attachment of ink mist or the like. As a result, in a case where the sensor fault finding section 411 has gauged that the sensor 90 is not able to be used irrespective of whether the learned I/C number is less than the predetermined value (step S52: No), it is assumed that the printing device 10 or the sensor 90 is in an abnormal usage state. As a result, in the case where the learned I/C number is less than the predetermined value (step S52: No), the CPU 41 displays information which indicates an error in the main body of the printing device 10 on the display panel 70 which is connected to the control section 40 or the display screen of the computer 60 which is connected to the printing device 10 via the interface 72.

In a case where the learned I/C number is the predetermined value or more (step S52: Yes), the CPU 41 sets the ink near-end determination method switching bit to "1" (step S53). By doing this, a process where it is determined that it is the near-end of the ink based on the learned sensor end value is performed since the CPU 41 determines that the ink near-end determination method switching bit in the EEPROM 45 is "1" (step S10: No) when the power source is next turned on or the ink cartridge 100 is exchanged.

When the ink near-end determination method switching bit is set to "1", the printing process, the flushing, or the process for cleaning the printing head 35 is executed in step S54 in the same manner as the case where the ink near-end determination method switching bit is set to "0" (step S54). The printing process, the flushing, or the process for cleaning the printing head is executed in the same manner as in step S54 even in a case where it is determined that the ink near-end determination method switching bit is "1" in step S10.

The determination section 413 determines that it is the near-end of the ink when the printing process, the flushing, or the process for cleaning the printing head 35 is executed in step S54 and the estimated consumption amount which is stored in the RAM 44 has reached the learned sensor end value which is stored in the EEPROM 45 (step S57: Yes). In a case where the estimated consumption amount has not reached the learned sensor end value (step S57: No), the printing process, the flushing, or the process for cleaning the printing head 35 is subsequently executed by returning the printing process which accompanies the ink near-end determination process to step S54.

When the determination section 413 determines that it is the near-end of the ink based on the learned sensor end value, the processes from step S60 to step S80 described above are performed in the same manner as the case where the ink near-end determination method switching bit is 0.

FIG. 9 is a view illustrating an example of data which is stored in the EEPROM 45 via the ink near-end determination process described above. The learned sensor end value and the learned I/C number are stored in the EEPROM 45 for each of the ink cartridges of the four colors of ink of cyan C, magenta M, yellow Y, and black K.

FIG. 10 is a view for describing a specific example of learning in step S40. There will be description of an example where a third ink cartridge is mounted in the printing device 10 which is shown by a bold frame a1 in FIG. 10, a n+1$^{th}$ ink cartridge is mounted in the printing device 10 which is shown by a bold frame b1 when the near-end of the ink has been determined in the third ink cartridge, and the near-end of the ink has been determined in the n+1$^{th}$ ink cartridge. Here, the I/C number shown in FIG. 10 indicates the ordering of the ink cartridge of the same ink color and effective ink amount by counting from the start of the usage of the printing device 10. When the third ink cartridge has been mounted in the printing device 10, it is gauged that the sensor 90 is able to be used (step S11 in FIG. 7: Yes). As a result, the determination section 413 determines that it is the near-end of the ink in the third ink cartridge based on the output from the sensor 90. The estimated consumption amount when the near-end of the ink is detected based on the output from the sensor 90 (referred to below as "sensor end amount") is "E3". The learned sensor end value "C3" is calculated using formula (1) described above based on the value of "E3" and the learned sensor end value C2.

On the other hand, it is determined that the sensor 90 is not able to be used when the n+1$^{th}$ ink cartridge has been mounted (step S11 in FIG. 7: No). If the learned I/C number is the predetermined number or more, the determination section 413 determines that it is the near-end of the ink in a case where the estimated consumption amount has reached the learned sensor end value Cn. That is, when it is determined that the sensor 90 is not able to be used when the n+1$^{th}$ ink cartridge has been mounted, the sensor end amount of the n+1$^{th}$ ink cartridge is the same value of the learned sensor end value "Cn".

There is a difference in the printing device 10 between the amount of ink which is assumed in advance to be discharged for a single dot and the amount of ink which is actually discharged due to causes such as variation in the manufacturing of each of the nozzles which are provided in the printing head 35 and the like. In addition, there is also variation between different units in the amount of ink which is discharged for a single dot by design and the amount of ink which is actually discharged due to differences in the units of printing devices 10. Furthermore, there is also variation between each of the units in the level where the sensor 90 detects the near-end of the ink due to variation in the positioning of the attachment of the sensor 90, variation in the positioning of the prisms 170 in the ink cartridges 100, and the like. In such a case, the actual ink consumption amounts when it is determined that it is the near-end of the ink based on the output of the sensor 90 and the estimated consumption amount do not necessarily match. As a result, when the near-end of the ink is determined using the estimated consumption amount, there is a concern that there may be more residual ink or more ink consumed than was assumed. However, in the first embodiment described above, the learned sensor end value is calculated from the estimated consumption amount when the near-end of the ink has been determined based on the output from the sensor 90. Then, the learned sensor end value is a statistical value of the estimated consumption amount at the time at the end of the ink which is calculated prior to the fault in the sensor 90, and the learned sensor end value is updated every time that a new ink cartridge is mounted, the ink is consumed, and the near-end of the ink is determined using the sensor 90. Accordingly, it is possible to determine that it is the near-end of the ink at a point in time when the estimated consumption amount has reached the learned sensor end value in a case where the sensor 90 is faulty.

In addition, the learned sensor end value is the coefficient α being multiplied with the estimated consumption amount when the near-end of the ink is immediately previously (finally) detected using the sensor 90. It is possible for the value of the coefficient α to be set so that the ratio of the estimated consumption amount with regard to the learned sensor end value, when the near-end of the ink has been determined immediately before there is a fault in the sensor 90, is larger. By doing this, it is possible to determine that it is the near-end of the ink by reflecting the immediately previous ink discharge circumstances since the learned sensor end value is a value which most reflects the immediately previous estimated consumption amount at the time of the end of the ink.

B. Second Embodiment

In the first embodiment, there was description where the ink cartridges with the same ink color which were exchanged have the same effective ink amount. That is, there was description where the ink cartridges, which are newly mounted in the printing device 10 due to exchanging of the ink cartridges after the ink in the ink cartridge has been consumed, are all ink cartridges with the same capacity. In contrast to this, in a second embodiment, there is a description with regard to a case where there is attaching and detaching of the ink cartridges 100 with the effective ink amounts which are different due to exchanging with ink cartridges with the same ink color. Here, the configuration of the printing device 10 of the second embodiment is the same as the first embodiment.

Figure 11:
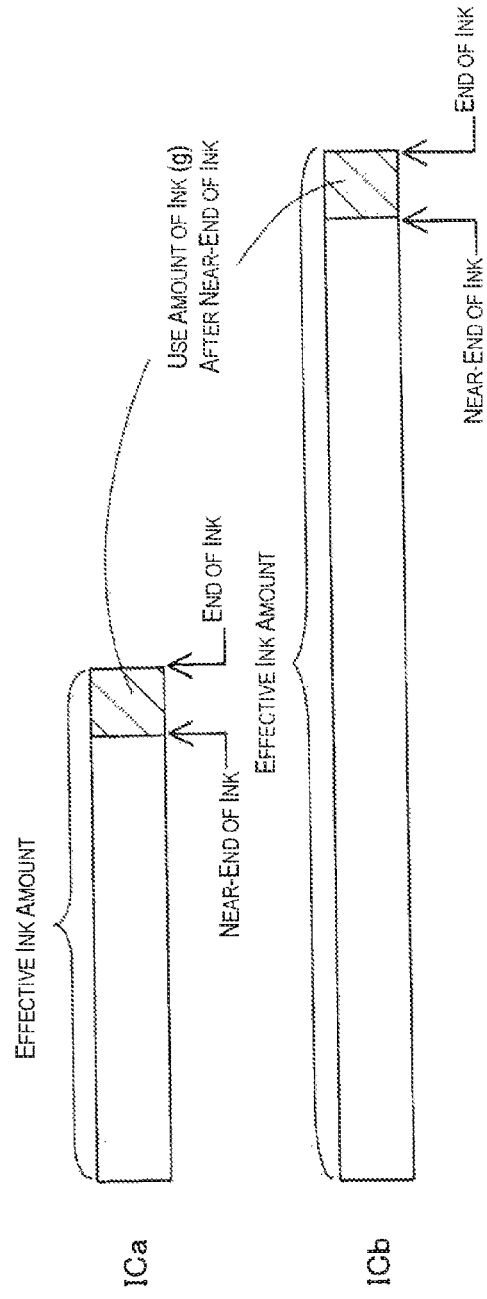
FIG. 11 is a view for describing ink cartridges with the effective ink amounts which are different.

FIG. 11 is a view for describing the ink cartridges 100 with the effective ink amounts which are different. The color of the ink which is contained in an ink cartridge ICa and an ink cartridge ICb is the same and the ink cartridges ICa and ICb are attached and detached in the same position in the carriage 20. The effective ink amounts of the ink cartridges ICa and ICb are different and respectively 10 (g) and 20 (g). In the embodiment, the ratio of the amounts of ink which are consumed until it is determined that it is the near-end of the ink based on the output form the sensor 90 (ink consumption amount at the time of the end of the ink is determined using the sensor) in terms of design is 90% in the ink cartridge ICa (9 (g)) and 95% in the ink cartridge ICb (19 (g)). That is, the amount of liquid when the near-end of the ink is determined using the sensor (the theoretical value of the amount of the liquid which has been consumed when the predetermined amount has been reached) is different in a case where the ink cartridge ICa and the ink cartridge ICb are used in the printing device 10 in the standard format under the standard environment.

The residual amount of the ink when the near-end of the ink is detected using the sensor in terms of design is the same but the estimated consumption amount at a time when the near-end of the ink is detected based on the output from the sensor 90 is different when it is possible for the ink cartridges with the effective ink amounts which are different to be mounted in the printing device 10. Since the learned sensor end value is the statistical value of the estimated consumption amount, errors in the learned sensor end values according to the differences in the effective ink amounts are accumulated when the learned sensor end value is calculated and updated from the estimated consumption amount at a time when the near-end of the ink of the ink cartridge ICa and the ink cartridge ICb shown in FIG. 11 is determined.

Therefore, the following correction is performed by the CPU 41 in a case where the ink cartridge which has a predetermined effective ink amount is set as a reference in advance and the effective ink amounts of a reference ink cartridge and the ink cartridge which is mounted are different. In the embodiment, the learned sensor end value is calculated by the estimated consumption amount at a time of the end of the ink in the ink cartridge ICb being corrected with the ink cartridge ICa as a reference. That is, the statistical value of the estimated consumption amount (the learned sensor end value) is updated with the ink cartridges as the ink cartridges where the effective ink amount is the same as the ink cartridge ICa are mounted in the printing device.

First, there is description of the updating of the learned sensor end value in a case where the ink cartridge ICb with the effective ink amount which is different is mounted using FIG. 7 in the first embodiment described above. When the ink cartridge ICb is mounted, the CPU 41 reads out the ink cartridge information which is stored in the memory provided in the ink cartridge ICb and stores the ink cartridge information in the RAM 44 in the same manner as the first embodiment described above (step S5 in FIG. 7). Then, in the ink cartridge ICb which has been mounted, the near-end of the ink is not detected using the sensor 90 (step S7 in FIG. 7: No), the ink near-end determination method switching bit is "0" (step S10 in FIG. 7: Yes), and if it is possible for the near-end of the ink to be determined using the sensor 90 (step S11 in FIG. 7: Yes), the printing process, the flushing, or the process for cleaning the printing head 35 is performed according to an instruction from the user, the computer, or the like (step S20 in FIG. 7).

When the determination section 413 detects the near-end of the ink in the ink cartridge ICb based on the output from the sensor 90 (step S30 in FIG. 7: Yes), the learning section 414 calculates the learned sensor end value Cn as below from the estimated consumption amount when the near-end of the ink is detected (the ratio of the ink consumption amount with the effective ink amount as a reference; the estimated consumption amount is 100% when the estimated consumption amount and the effective ink amount are the same). Specifically, a correction coefficient is calculated by the ink consumption percentage at the time of the end of the ink being determined using the sensor in terms of design with regard to the effective ink amount in the ink cartridge ICa (90(%)) being divided by the ink consumption percentage at the time of the end of the ink being determined using the sensor in terms of design with regard to the effective ink amount in the ink cartridge ICb (95(%)). Then, the learned sensor end value is calculated by multiplying the correction coefficient to the estimated consumption amount at the time of the end of the ink being determined using the sensor of the ink cartridge ICb. The learned sensor end value of the ink cartridge ICa and the learned I/C number of the ink cartridge ICa which are stored in the EEPEROM 45 are updated in the same manner as when the learned sensor end value in the ink cartridge ICb is calculated and when the learned sensor end value in the ink cartridge ICa which is the reference is calculated (step S40 in FIG. 7). After this, the processes from step S60 to step S80 shown in FIG. 7 are performed in the same manner as the first embodiment described above. By doing this, it is possible to update the learned sensor end value of the ink cartridge ICa which is the reference by multiplying the correction coefficient to the estimated consumption amount at the time of the end of the ink is determined using the sensor with regard to the ink cartridge ICb even if the ink cartridge ICb where the capacity is different is mounted.

Next, there will be description of the ink near-end determination process in a case where the ink cartridge ICb is mounted in the printing device 10 and it is not possible to determine that it is the near-end of the ink using the sensor (step S11 in FIG. 7: No). When the ink cartridge ICb is mounted, the CPU 41 reads out the ink cartridge information which is stored in the memory 151 provided in the ink cartridge ICb and stores the ink cartridge information in the RAM 44 in the same manner as the first embodiment described above (step S5 in FIG. 7). Then, in the ink cartridge ICb which has been mounted, the near-end of the ink is not detected using the sensor (step S7 in FIG. 7: No), the ink near-end determination method switching bit is "0" (step S10 in FIG. 7: Yes), and if the learned I/C number is sufficient (step S52 in FIG. 7: Yes), the CPU 41 performs the printing process, the flushing, or the process for cleaning the printing head 35 according to an instruction from the user, the computer, or the like (step S54 in FIG. 7). Then, the determination section 413 determines that it is the near-end of the ink in a case where the estimated consumption amount of the ink cartridge ICb has reached a value where the inverse of the correction coefficient is multiplied with the learned sensor end value of the ink cartridge ICa which is the reference ink cartridge (step S57 in FIG. 7). After this, the processes from step S60 to step S80 shown in FIG. 7 are performed in the same manner as the first embodiment described above. By doing this, it is possible to determine that it is the near-end of the ink in a case where the estimated consumption amount of the ink cartridge with the effective ink amount which is different has reached a value where the inverse of the correction coefficient is multiplied with the learned sensor end value of the ink cartridge where the effective ink amount is the reference. As such, it is possible to determine that it is the near-end of the ink with the same level of accuracy as the sensor 90 even when the ink cartridge with the effective ink amount which is different is mounted.

According to the second embodiment which is described above, the learning section 414 sets the ink cartridge 100 which is the reference and calculates the ink consumption percentage at the time of the end of the ink being determined using the sensor from the effective ink amount and the estimated consumption amount at the time of the end of the ink being determined using the sensor in terms of design. Then, the correction coefficient is calculated by the ink consumption percentage at the time of the end of the ink being determined using the sensor with regard to the ink cartridge where the effective ink amount is the reference being divided by the ink consumption percentage at the time of the end of the ink being determined using the sensor in the ink cartridge 100 with the effective ink amount which is different in terms of design. The learned sensor end value of the ink cartridge where the effective ink amount is the reference is calculated by the correction coefficient being multiplied with the estimated consumption amount at the time of the end of the ink being determined using the sensor in the ink cartridge 100 with the effective ink amount which is different. By doing this, it is possible for the learned sensor end value to be updated in accordance with the ink near-end determination process which is shown in FIG. 7 in the first embodiment. As such, it is possible to effectively utilize the data storage region in the printing device 10 since it is not necessary to store the learned sensor end value and the learned I/C number for each of the ink cartridges with the effective ink amount which is different. In addition, it is possible to determine that it is the near-end of the ink in a case where the estimated consumption amount of the ink cartridge with the effective ink amount which is different has reached a value where the inverse of the correction coefficient is multiplied with the learned sensor end value of the ink cartridge where the effective ink amount is the reference even in a case where the sensor 90 is faulty. As such, it is possible to determine that it is the near-end of the ink with the same level of accuracy as the sensor even when the ink cartridge with the effective ink amount which is different is mounted and the sensor is not able to be used.

C. Third Embodiment

In the first embodiment and the second embodiment, the learned sensor end value is calculated based on the estimated consumption amount when the near-end of the ink is detected using the sensor. In the third embodiment, a learned estimated consumption amount difference percentage is calculated based on a difference (estimated consumption amount difference percentage) in the ink consumption amount at the time of the end of the ink being determined using the sensor in terms of design and the estimated consumption amount when the near-end of the ink is detected using the sensor. Then, the learned sensor end value is calculated from the estimated consumption amount difference percentage. Here, the configuration of the printing device in the third embodiment is the same as the first embodiment. The estimated consumption amount difference percentage is information which is the basis for evaluating the learned sensor end value and is equivalent to threshold information in the claims.

FIG. 12 is a view for describing an estimated consumption amount difference percentage DW. The estimated consumption amount difference percentage DW is a value which indicates a ratio of the estimated consumption amount when the near-end of the ink is determined using the sensor and the ink consumption amount when the near-end of the ink is determined using the sensor in terms of design (a theoretical value of the amount of liquid which has been consumed when the predetermined amount has been reached) and is calculated using the following formula (2). Here, in the embodiment, the estimated consumption amount is not a ratio with regard to the effective ink amount but is calculated as a consumption amount (g).

Formula (2)

$$DW_n = \frac{\text{At End of Ink Determined By Sensor}}{E_n} \times 100 \quad (2)$$

FIG. 12 shows the estimated consumption amount difference percentage of three of the ink cartridges (ICc, ICd, and ICe) when the determination section 413 determines that it is the near-end of the ink based on the output from the sensor 90. The ink cartridges ICc, ICd, and ICe are ink cartridges with the same color. The ink cartridges ICc, ICd, and ICe are ink cartridges which all have the effective ink amount of 10 (g), and in addition, the ink consumption amounts from after the near-end of the ink which is estimated by dot counting are each 1 (g). With regard to the ink cartridges, 9 (g) of ink is consumed in terms of design when the determination section 413 determines that it is the near-end of the ink based on the output from the sensor 90 in the embodiment. However, the estimated consumption amount at the time of the end of the ink being determined using the sensor differs due to the usage state of the printing device, changes over time, and the like. For example, the estimated consumption amounts at the time of the end of the ink being determined using the sensor for the ink cartridges ICc, ICd, and ICe are 8.2 (g), 9.0 (g), and 10.0 (g) respectively. The estimated consumption amount difference percentage in this case respectively differs to 110(%), 100(%), and 90(%) in the ink cartridges ICc, ICd, and ICe. A difference in the ink consumption amount at the time of the end of the ink being determined using the sensor when designed and the estimated consumption amount when the end of the ink is determined using the sensor is detected is smaller as the estimated consumption amount difference percentage approaches 100%. In the embodiment, a learned estimated consumption amount difference percentage ADW is calculated using the following formula (3) based on the estimated consumption amount difference percentage DW at the time of the end of the ink being determined using the sensor which is calculated in this manner. The learned estimated consumption amount difference percentage ADW is a statistical value of the estimated consumption amount difference percentage which is calculated on the basis of an estimated consumption amount difference percentage DWn which has been calculated immediately previously and a learned estimated consumption amount difference percentage ADWn−1 which was calculated before DWn. In other words, the learned estimated consumption amount difference percentage ADW is a "statistical value of a ratio" of the ink consumption amount at the time of the end of the ink being determined using the sensor in terms of design (a theoretical value) and the estimated consumption amount when the near-end of the ink is actually detected based on the sensor.

Formular (3)

$$ADW_n = \frac{DW_n + (n-1)ADW_{n-1}}{n} \quad (3)$$

Figure 13:
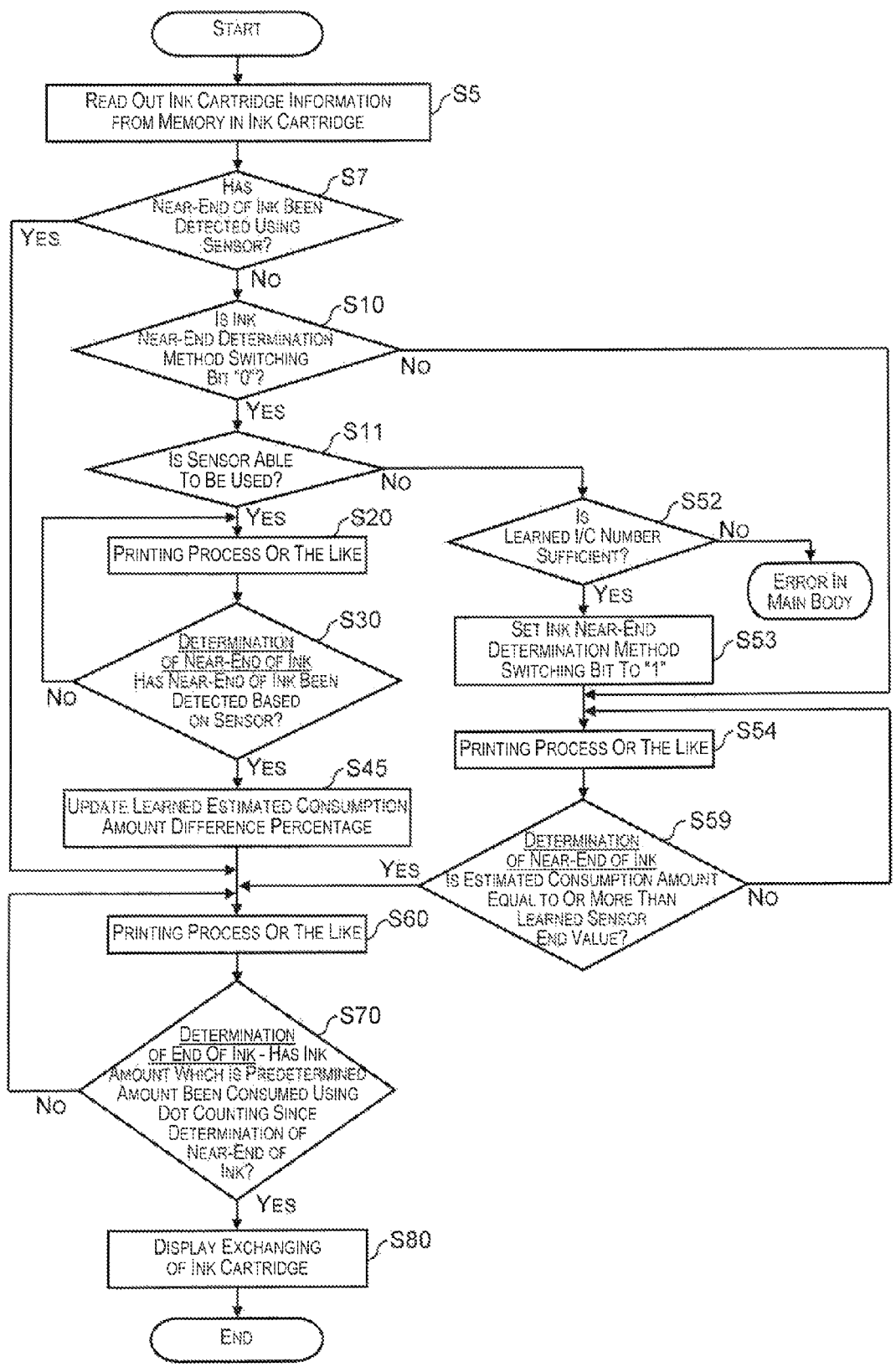
FIG. 13 is a flow chart of a printing process which includes an ink near-end determination process.

FIG. 13 is a flow chart of the ink near-end determination process which is performed by the printing device 10 in the third embodiment. The difference in the first embodiment (FIG. 7) and the third embodiment (FIG. 13) is that, in contrast to the learned sensor end value being updated when it is determined that it is the near-end of the ink based on the output from the sensor 90 in the first embodiment (step S40 in FIG. 7), in the third embodiment the estimated consumption amount difference percentage is updated (step S45 in FIG. 13). A specific example of learning will be described later. In addition, in the first embodiment, when the sensor 90 is not able to be used (step S11 in FIG. 7: No) and the learned I/C number is sufficient (step S52 in FIG. 7: Yes), the determination section 413 determines that it is the near-end of the ink based on the learned sensor end value (step S57 in FIG. 7). In contrast to this, in the third embodiment, the determination section 413 determines that it is the near-end of the ink when the estimated consumption amount has reached the learned sensor end value by the learning section 414 converting the learned estimated consumption amount difference percentage to the learned sensor end value using the following formula (4) (step S59 in FIG. 13). The description of other processes is omitted since the other processes are the same as in the first embodiment.

Formula (4)

$$C_n = \frac{\text{At End of Ink Determined By Sensor}}{ADW_n} \times 100 \quad (4)$$

FIG. 14 is a view illustrating an example of data which is stored in the EEPROM 45 via the ink near-end determination process of FIG. 13. In contrast to in the first embodiment where the learned sensor end value and the learned I/C number are stored for each of the ink cartridges 100 of the four colors of cyan C, magenta M, yellow Y, and black K, in the third embodiment the learned estimated consumption amount difference percentage and the learned I/C number are stored.

FIG. 15 is a view for describing a specific example of learning in step S45. There will be description of an example, with regard to the ink cartridge with the same color (for example, black K), where a third ink cartridge is mounted in the printing device 10 which is shown by a bold frame a2 in FIG. 15, a n+1$^{th}$ ink cartridge is mounted in the printing device 10 which is shown by a bold frame b2 when the near-end of the ink has been determined in the third ink cartridge, and the near-end of the ink has been determined in the n+1$^{th}$ ink cartridge. Here, the I/C number shown in FIG. 15 indicates the ordering of the ink cartridge of the same ink color and effective ink amount by counting from the start of the usage of the printing device 10. When the third ink cartridge has been mounted in the printing device 10, it is gauged that the sensor 90 is able to be used (step S11 in FIG. 13: Yes). As a result, the determination section 413 determines that it is the near-end of the ink in the third ink cartridge based on the output from the sensor 90 in the third ink cartridge. The estimated consumption amount at this time (the sensor end amount) is "E3". The estimated consumption amount "E3"

when the learning section 414 gauges that it is the near-end of the ink based on the output from the sensor 90 is converted to an estimated consumption amount difference percentage "DW3" using formula (2). Then, a learned estimated consumption amount difference percentage "ADW3" is calculated using formula (3) based on the estimated consumption amount difference percentage "DW3" and a learned estimated consumption amount difference percentage "ADW2" which is previously learned (at the time of the end of the ink being determined using the sensor of the second ink cartridge).

On the other hand, it is determined that the sensor 90 is not able to be used when the n+$^{th}$ ink cartridge has been mounted (step S11 in FIG. 13: No). If the learned I/C number at this time has reached the predetermined I/C number (step S52 in FIG. 13: Yes), the determination section 413 determines that it is the near-end of the ink in a case where the estimated consumption amount which is calculated by the dot counting section 412 has reached the learned sensor end value Cn (step S59 in FIG. 13). The learned sensor end value Cn in this case is a value which is calculated based on the learned estimated consumption amount difference percentage ADW and the ink consumption amount at the time of the end of the ink being determined using the sensor and is evaluated using the following formula (4).

According to the third embodiment which is described above, the estimated consumption amount difference percentage is calculated from the estimated consumption amount when the near-end of the ink is detected based on the output from the sensor 90. Next, the learned estimated consumption amount difference percentage is calculated based on the estimated consumption amount difference percentage. Then, in a case where the sensor 90 is faulty, the ink consumption amount at the time of the end of the ink being determined using the sensor is converted to the learned sensor end value by being divided by the learned estimated consumption amount difference percentage. Since it is determined that it is the near-end of the ink in a case where the learned sensor end value which is evaluated in this manner has reached the estimated consumption amount which is estimated by the dot counting section 412, it is possible to determine that the liquid has reached the near-end of the ink with the same accuracy as the sensor 90. In addition, the learned estimated consumption amount difference percentage ADWn is a statistical value of the estimated consumption amount difference percentage DW which is calculated on the basis of the estimated consumption amount difference percentage DWn which is calculated when the near-end of the ink is immediately previously (finally) detected using the sensor 90 and the learned estimated consumption amount difference percentage ADWn−1 which is calculated before the estimated consumption amount difference percentage DWn. Accordingly, if it is determined that it is the near-end of the ink based on the learned sensor end value which is evaluated from the learned estimated consumption amount difference percentage, variation in the amount of ink which is able to be used after the determination of the near-end of the ink is low and it is possible to correctly estimate the amount of ink which is able to be used after the end of the ink is determined using the sensor. As a result, consumption is possible without a surplus effective ink amount in the ink cartridge 100.

D. Fourth Embodiment

In the first embodiment and the third embodiment, the learned sensor end value is calculated with regard to the ink cartridges 100 which have the same effective ink amount. In addition, in the second embodiment, the learned sensor end value is calculated by carrying out a correction with regard to the ink cartridge 100 with the effective ink amount which is different with the predetermined ink cartridge 100 as a reference. In a fourth embodiment, the learned sensor end value is calculated based on the learned estimated consumption amount difference percentage without correction as in the third embodiment even if the effective ink amounts of the ink cartridges 100 are different.

Figure 16:
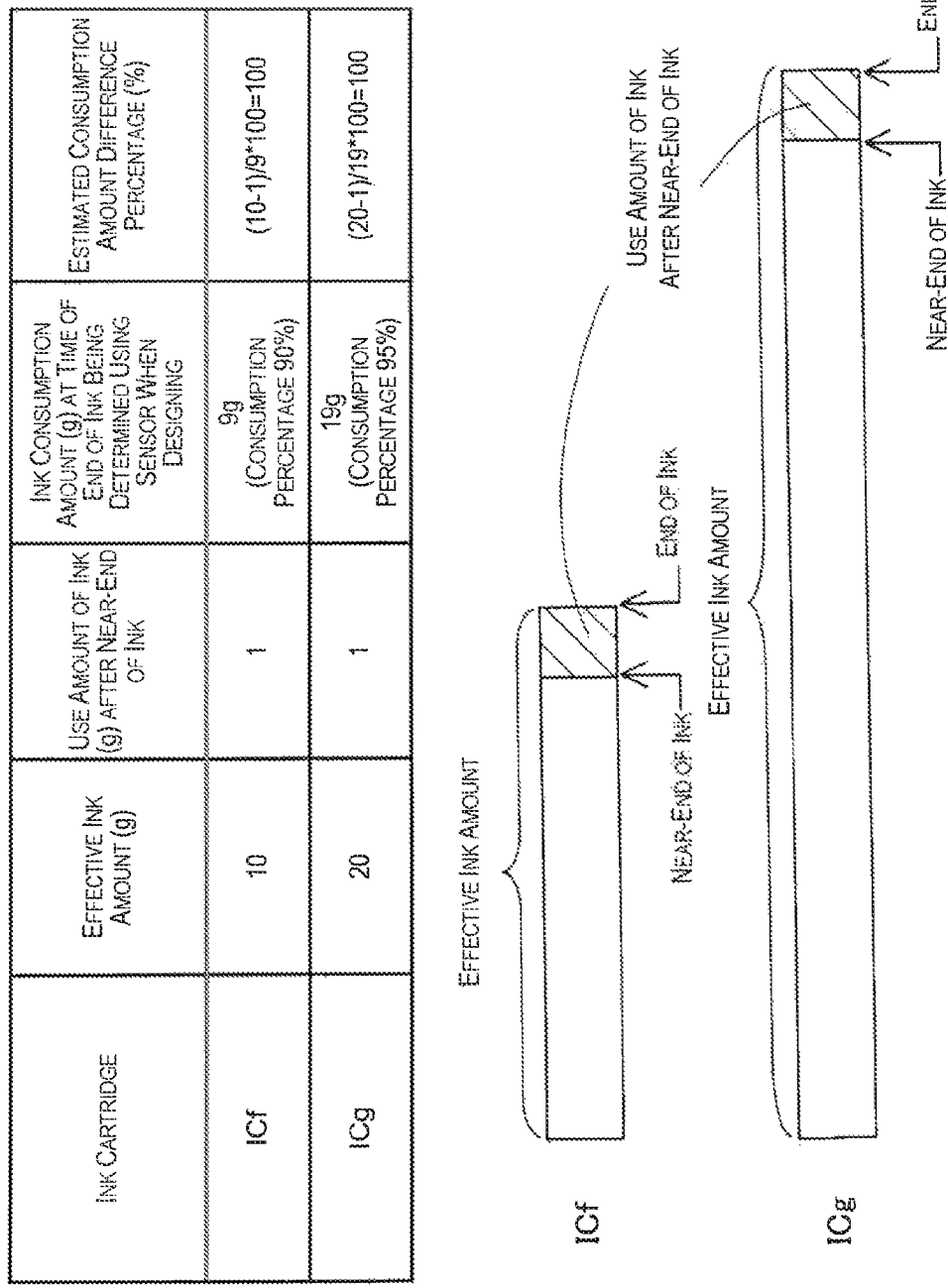
FIG. 16 is a view for describing an estimated consumption amount difference percentage of ink cartridges with the effective ink amounts which are different.

FIG. 16 is a view for describing the estimated consumption amount difference percentage of the ink cartridges 100 with the effective ink amounts which are different. The color of the ink which is contained in an ink cartridge ICf and an ink cartridge ICg is the same and the ink cartridges ICf and ICg are attached and detached in the same position in the carriage 20. The ink cartridges ICf and ICg have the ink consumption amount which is estimated using dot counting of 1 (g) from after the near-end of the ink is detected based on the output from the sensor 90, but the effective ink amounts of the ink cartridges ICf and ICg are different and respectively 10 (g) and 20 (g). In the embodiment, the amount of ink which is consumed until it is determined that it is the near-end of the ink based on the output form the sensor 90 (ink consumption amount at the time of the end of the ink being determined using the sensor) in terms of design is 9 (g) in the ink cartridge ICf and 19 (g) in the ink cartridge ICg.

Even when the effective ink amounts are different in this manner, as shown in FIG. 16, the estimated consumption amount difference percentage of the ink cartridge ICf is 100 (%) and the estimated consumption amount difference percentage of the ink cartridge ICg is 100(%). That is, the estimated consumption amount difference percentage is a numerical value which does not depend on the effective ink amount. Accordingly, the learned estimated consumption amount difference percentage is calculated and updated without correction of the learned sensor end value of the ink cartridge with the effective ink amount which is different by setting the ink cartridge which is the reference as in the second embodiment even in a case where the effective ink amounts are different by evaluating the learned sensor end value from the learned estimated consumption amount difference percentage which is a statistical value of the estimated consumption amount difference percentage.

According to the fourth embodiment which is described above, even when the ink cartridges with the effective ink amounts which are different are used, since the estimated consumption amount difference percentage does not depend on the effective ink amount, it is possible for the learning section 414 to calculate and update the learned estimated consumption amount difference percentage for the determining of the near-end of the ink without performing correction. In addition, it is possible to effectively utilize the data storage region in the printing device 10 since it is not necessary for data to be stored in the EEPROM 45 for each effective ink amount of the ink cartridge 100.

E. Modified Examples

Above, various embodiments of the present invention have been described, but the present invention is not limited to the embodiments and it is possible to adopt various configurations within a scope that does not depart from the gist of the present invention. For example, the function which is realized using software may be realized using hardware. Other than this, the modifications below are possible.

E-1. Modified Example 1

When the CPU 41 reads out information in the ink cartridge 100 from the memory 151 of the substrate 150 which is provided in the ink cartridge 100, it is possible for the learning section 414 to gauge whether or not the ink cartridge 100 is guaranteed by the manufacturer of the printing device 10 based on the information of the memory 151 and the like. In a case of an ink cartridge which is not guaranteed, there is a concern that the product quality such as the viscosity of the ink may be different and there is a concern that the estimated consumption amount using the dot counting section 412 may be significantly different in this case. In addition, there are cases where the variation of the effective ink amounts between ink cartridges which are not guaranteed is larger than the variation when there is a guarantee from the manufacturer of the printing device 10. Accordingly, it is possible for the learning section 414 to not learn the learned sensor end value and the learned estimated consumption difference percentage using the ink cartridge, and in addition, to not update the learned I/C number. By doing this, it is possible to further improve the reliability of the learned sensor end value and the learned estimated consumption amount difference percentage. In addition, it is possible for the learning section 414 to gauge whether the ink cartridge which has been mounted is an ink cartridge for filling which is for filling the ink into the ink path of the printing device 10 based on the information in the memory 151 of the ink cartridge. It is possible for the learning section 414 to not learn the learned sensor end value and the learned estimated consumption amount difference percentage using the ink cartridge, and in addition, to not update the learned I/C number. By doing this, it is possible to further improve the reliability of the learned sensor end value and the learned estimated consumption amount difference percentage.

E-2. Modified Example 2

Figures 17, 18:
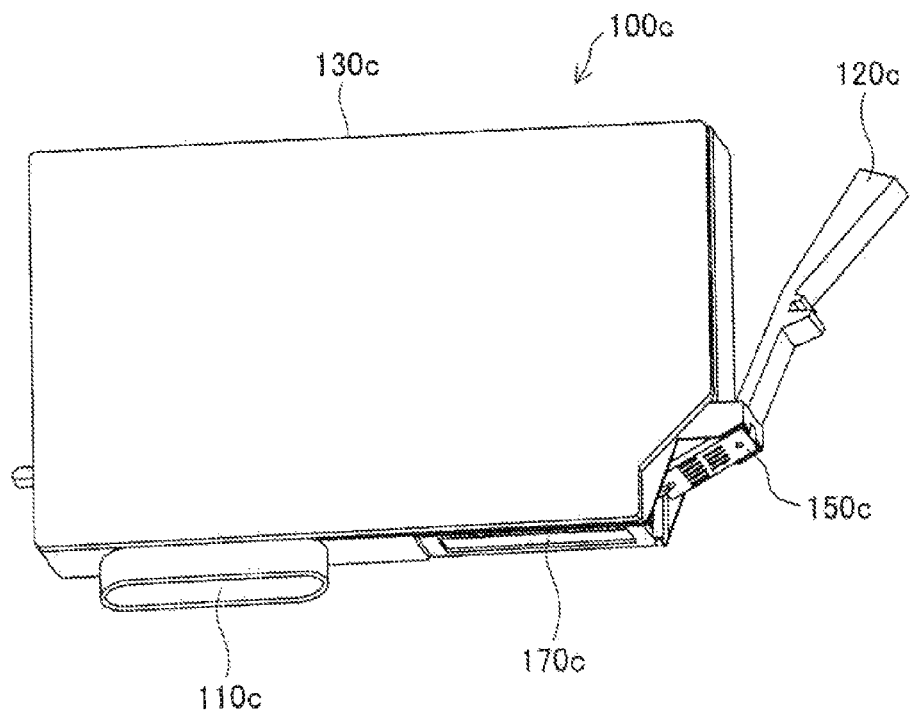
FIG. 17 is a view illustrating another example of data which is stored in an EEPROM.
FIG. 18 is a perspective view illustrating another configuration of an ink cartridge.

FIG. 17 is a view illustrating another example of data which is stored in the EEPROM 45. In the first embodiment (FIG. 9) and the third embodiment (FIG. 14) described above, the learned sensor end value or the learned estimated consumption amount difference percentage and the learned I/C number are stored in the EEPROM 45 for each of the color ink cartridges 100 with the colors of cyan C, magenta M, and yellow Y. In contrast to this, in a case where the discharge diameter of the color inks and the like are substantially the same, since it is possible for determination of the near-end of the ink to be performed using the same learned sensor value with regard to all of the colors of color ink, for example, it is possible to store representative values of the data of the color ink cartridges with the colors of cyan C, magenta M, and yellow Y as shown in FIG. 17. Specifically, the learned sensor end value of the ink cartridge 100 of any one out of the color inks may be applied to the other color inks, and for example, it is possible to update the learned sensor end value where the learned sensor end value is calculated using the ink cartridge of cyan C even with the learned sensor end value which is calculated using the ink cartridge of yellow Y being stored as the data for "color". In this case, it is possible to increase the learned I/C number by "1" when the learned sensor end value of the ink cartridge 100 of any of the color inks has been updated. By doing this, it is possible to suppress the data storage which is stored in the EEPROM 45.

E-3. Modified Example 3

In the embodiment described above, an optical sensor is used as the sensor 90, but the sensor 90 which is used in the printing device 10 is not limited to this. For example, it is possible to use a sensor which uses a piezo element which is distorted by the application of a voltage.

E-4. Modified Example 4

The CPU 41 may adjust the amount of light which is radiated from the light emitting element 92 in a case of a decrease or in a case of an increase in voltage value based on the light which is incident onto the light receiving element by being reflected by the fault finding plate 81. By doing this, it is possible to correctly determine that it is near-end of the ink since the output of the sensor 90 is stable.

E-5. Modified Example 5

It is possible to adopt an ink cartridge which another arbitrary configuration other than the ink cartridge 100 which is shown in the embodiments described above. FIG. 18 is a perspective view illustrating another configuration of the ink cartridge 100. A substrate 150c is attached to be inclined in an ink containing section 130c of an ink cartridge 100c. In addition, a prism 170c may be provided on a lever 120c side. In addition, an ink supply port 110c may be sealed using a cap, a film, or the like (not shown).

E-6. Modified Example 6

In the first embodiment described above, if it is determined that it is the end of the ink in a case where the amount of ink which is a predetermined amount of ink is consumed using dot counting (step S70 in FIG. 7) after it is determined that it is the near-end of the ink (step S3 or step S57 in FIG. 7). Other than this, the determination section 413 may update the learned sensor end value by determining that it is the end of the ink based on the sensor 90. Then, it may be determined that it is the end of the ink based on the learned sensor end value and the estimated consumption amount in the same manner as the first embodiment in a case where the sensor 90 is faulty.

Figure 19:
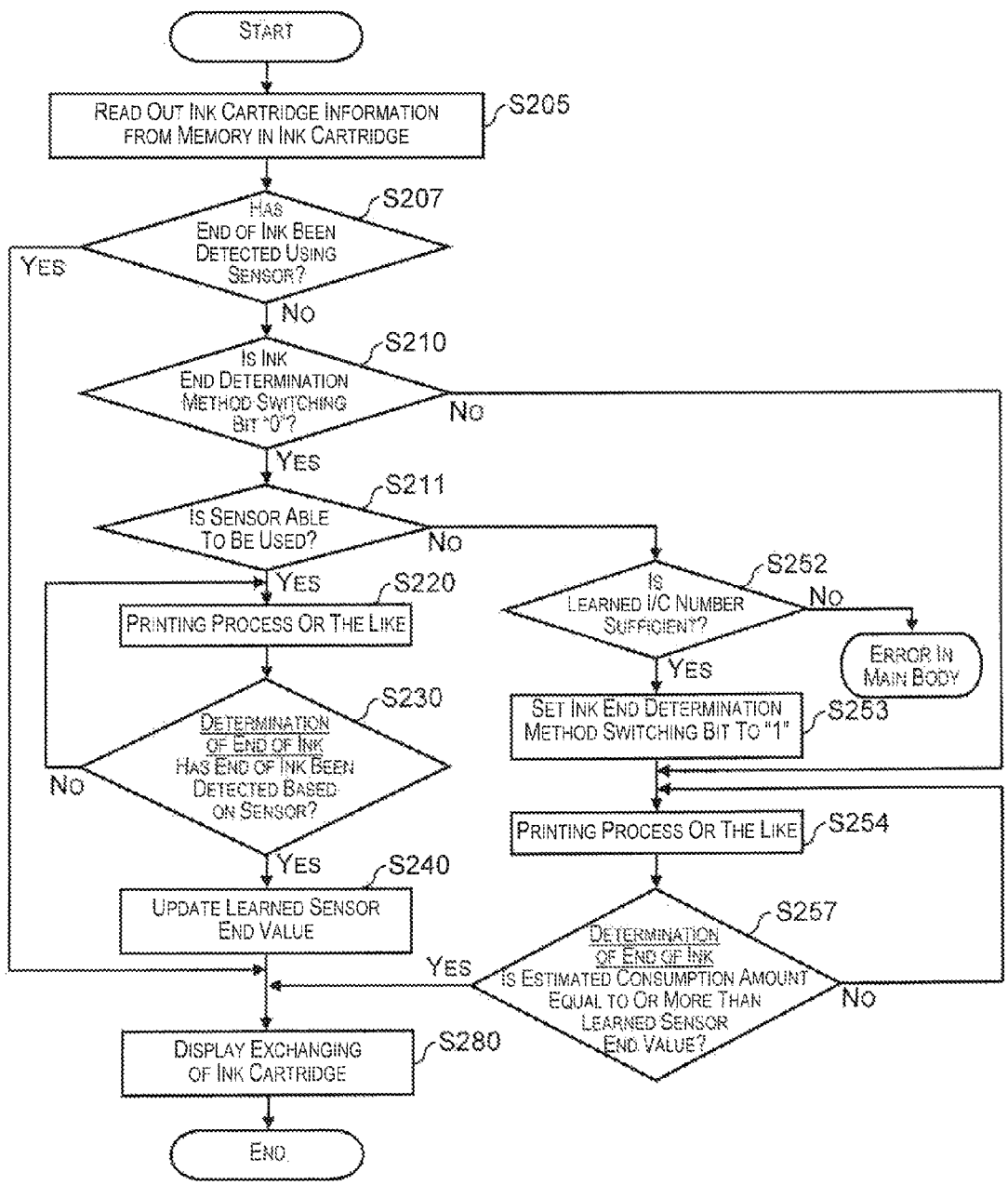
FIG. 19 is a flow chart of an ink end determination process.

FIG. 19 is a flow chart of the ink end determination process which is executing by the control section 40. In the modified example, the ink end determination switching bit, which is for switching whether the gauging of whether or not the end of the ink has been reached is performed based on the output from the sensor 90 or performed based on the learned sensor end value, is stored in the EEPROM 45.

First, when the ink cartridge 100 is mounted, the CPU 41 reads out the ink cartridge information which is stored in the memory 151 provided in the ink cartridge 100 and stores the ink cartridge information in the RAM 44 in the same manner as the first embodiment described above (step S205). Then, in the ink cartridge which has been mounted, the end of the ink is not detected using the sensor 90 (step S207: No), the ink end determination method switching bit is "0" (step S210: Yes), and if it is possible for the end of the ink to be determined using the sensor 90 (step S211: Yes), the printing process, the flushing, or the process for cleaning the printing head 35 is performed according to an instruction from the user, the computer, or the like (step S220).

When the determination section 413 determines that it is the end of the ink in the ink cartridge 100 based on the output from the sensor 90 (step S230: Yes), the learning section 414 calculates the learned sensor end value Cn in the same manner as the first embodiment described above. Then, the learned sensor end value and the learned I/C number of the ink cartridge are updated (step S240) and the CPU 41 instructs a display which requests the exchanging of the ink cartridge 100 on the display panel 70 which is connected to the control section 40 or the display screen of the computer 60 which is connected to the printing device 10 via the interface 72 (step S280).

On the other hand, in the ink cartridge 100 which has been mounted, if the end of the ink is not detected using the sensor 90 (step S207: No), the ink end determination method switching bit is "0" (step S210: Yes), and the sensor 90 is not able to be used (step S211: Yes), the CPU 41 gauges whether or not the learned I/C number which is stored in the EEPROM 45 is the predetermined value or more (step S252). In a case where the learned I/C number is the predetermined value or more (step S252: Yes), the CPU 41 sets the ink end determination method switching bit to "1" (step S253). By doing this, the CPU 41 determines that the ink end determination method switching bit in the EEPROM 45 is "1" (step S210: No) when the power source is next turned on or the ink cartridge 100 is exchanged and a process where it is determined that it is the end of the ink based on the learned sensor end value is performed.

When the ink end determination method switching bit is set to "1", the printing process, the flushing, or the process for cleaning the printing head 35 is executed in the same manner as the case where the ink end determination method switching bit is set to "0" (step S254). The printing process, the flushing, or the process for cleaning the printing head 35 is executed in the same manner as in step S254 (step S254) even in a case where it is determined that the ink end determination method switching bit is "1" in step S210 (step S210: No). Then, the determination section 413 determines that it is the end of the ink in a case where the estimated consumption amount of the ink cartridge 100 has reached the learned sensor end value (step 257: Yes). In a case where the estimated consumption amount has not reached the learned sensor end value (step 257: No), the end determination process returns to step S254 and the printing process, the flushing, or the process for cleaning the printing head 35 is subsequently executed.

When the determination section 413 performs the determination that it is the end of the ink based on the learned sensor end value, the process of step S280 described above is performed in the same manner as the cases where the ink end determination method switching bit is 0.

If it is determined that it is the end of the ink as above, the learned sensor end value is calculated from the estimated consumption amount when the end of the ink is determined based on the output from the sensor 90. Then, the learned sensor end value is a statistical value of the estimated consumption amount at the time of end of the ink being determined using the sensor which is calculated before the sensor 90 becomes faulty, and the learned sensor end value is updated every time a new ink cartridge is mounted, the ink is consumed, and it is determined that it is the end of the ink using the sensor 90. Accordingly, it is possible to determine that it is the end of the ink at a point in time when the estimated consumption amount has reached the learned sensor end value in a case where the sensor is faulty.

E-7. Modified Example 7

In the third embodiment described above, the determination section 413 determines that it is the end of the ink in a case where the predetermined amount of ink has been consumed using dot counting after it is determined that it is the near-end of the ink (step S30 or step S59 in FIG. 13). Other than this, the determination section 413 may update the learned estimated consumption amount difference percentage by the end of the ink being determined based on the sensor 90. Then, it may be determined that it is the end of the ink based on the learned estimated consumption amount difference percentage, the learned sensor end value, and the estimated consumption amount in the same manner as the third embodiment.

Figure 20:
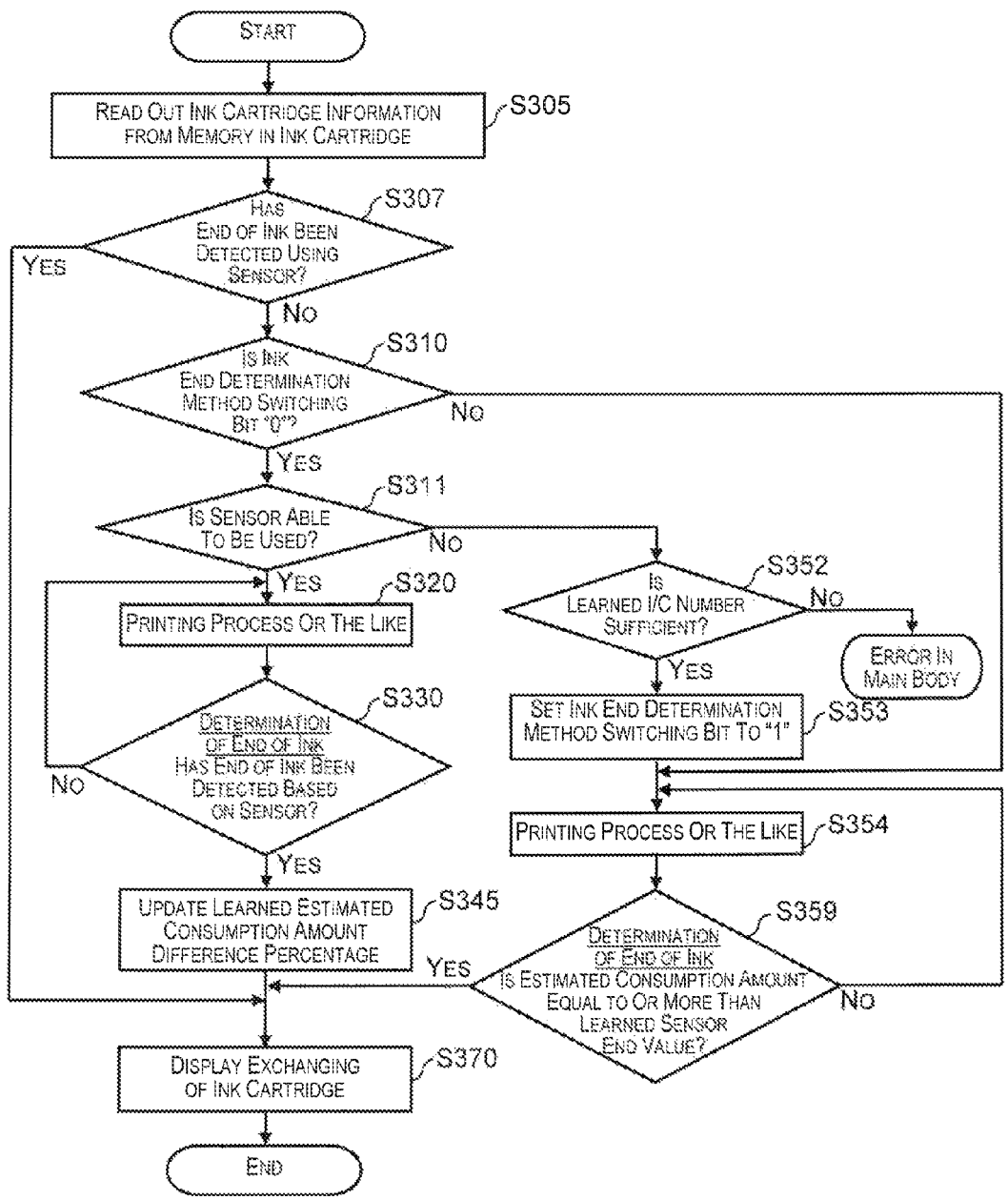
FIG. 20 is a flow chart of an ink end determination process.

FIG. 20 is a flow chart of the ink end determination process which is executed by the control section 40. The difference with modified example 6 described above is that, in contrast to the learned sensor end value being updated when it is determined that it is the end of the ink based on the output from the sensor 90 (step S240 in FIG. 19) in modified example 6, in the modified example the learned estimated consumption amount difference percentage is updated (S345 in FIG. 20). The method of learning is the same as in the third embodiment described above. In addition, in modified example 6, when the sensor 90 is not able to be used and the learned I/C number is sufficient, the determination section 413 determines that it is the near-end of the ink based on the learned sensor end value (step S257 in FIG. 19). In contrast to this, the determination section 413 determines that it is the end of the ink when the estimated consumption amount has reached the learned sensor end value by the learning section 414 converting the learned estimated consumption amount difference percentage to the learned sensor end value using formula (4) which was described in the third embodiment (step S359 in FIG. 20) in the modified example. The description with regard to other processes is omitted since the description is the same as modified example 6. If it is determined that it is the end of the ink based on the learned sensor end value which is evaluated from the learned estimated consumption amount difference percentage using a method such as this, variation in the amount of ink which is residual after the determination of the end of the ink is low and it is possible to correctly estimate the residual amount of ink after the end of the ink is determined using the sensor. As a result, consumption is possible without a surplus effective ink amount in the ink cartridge 100.

E-8. Modified Example 8

In the second embodiment described above, the determination section 413 determines that it is the near-end of the ink in the ink cartridge ICb in a case where the estimated consumption amount of the ink cartridge ICb has reached the learned sensor end value which is calculated by being multiplied with the inverse of the correction coefficient (step S57 in FIG. 7). Instead of this, the determination section 413 may determine that it is the near-end of the ink in the ink cartridge ICb in a case where a value, where the correction coefficient is multiplied with the estimated consumption amount of the ink cartridge ICb, has reached the learned sensor end value of the ink cartridge ICa.

E-9. Modified Example 9

The printing device 10 is not limited to an ink jet printing device and it is possible for the printing device 10 to be various printing devices which perform printing by using various fluids. For example, the printing device 10 may be a laser printer.

E-10. Modified Example 10

In the embodiments described above, the learned sensor end value is calculated using weighted averaging as shown in formula (1) and the learned estimated consumption amount difference percentage is calculated using arithmetic averaging as shown in formula (3), but the method for calculating the learned sensor end value and the learned estimated consumption amount difference percentage is not limited to this. In the first embodiment and the second embodiment, the learned sensor end value may be calculated using arithmetic averaging, and in the third embodiment, the learned estimated consumption amount difference percentage may be calculated using weighted averaging. In addition, for example, there may be calculation using another average value calculation method such as geometric averaging. In addition, the learned sensor end value and the learned estimated consumption amount difference percentage which are previously calculated may be stored and the median and the mode may be calculated. In addition, the ratio of the immediately previous estimated consumption amount difference percentage in the learned estimated consumption amount difference percentage may be increased by multiplying with the coefficient α when calculating the learned estimated consumption amount difference percentage.

E-11. Modified Example 11

In the embodiments described above, an example is described where the present invention is applied to the printing device and the ink cartridge, but the present invention may be used in a liquid consumption device which ejects or discharges liquids other than ink and is able to be applied to a liquid container which contains such a liquid. In addition, the liquid container of the present invention is able to flow into various types of liquid consumption devices which are provided with a liquid ejection head which discharges liquid droplets in small amounts and the like. A "liquid droplet" is a state of a liquid which is discharged from the liquid consumption device and includes particle shapes, teardrop shapes, and the drawing out of a trail with a thread shape. In addition, it is sufficient if the "liquid" referred to here is a material which is able to be ejected from the liquid consumption device. For example, it is sufficient if the substance is in a state which is a liquid phase, and not only a liquid state where the viscosity is high or low, a fluid state such as sol, a gel water, other inorganic solvents, organic solvents, solutions, liquid resins, and liquid metals (metal fusion liquids), or a liquid which is one state of the substance, but also includes where particles of a functional material which are formed as a solid material such as a pigment or a metal particle are dissolved, dispersed, or mixed in a solvent. In addition, ink as described in the embodiments described above, liquid crystals, or the like are given as representative examples of the liquid. Here, various types of liquid compositions such as a typical water-based ink, an oil-based ink, a shell ink, and a hot melt ink are included as the ink. As a specific example of the liquid consumption device, for example, there may be a liquid consumption device which ejects a liquid which includes a material in the form of a dispersion or a solution such as an electrode material or a colorant which is used in the manufacturing of a liquid crystal display, an EL (electroluminescence) display, a surface-emitting display, or a color filter and the like, a liquid consumption device which ejects a bioorganic substance which is used in manufacturing biochips, and a liquid consumption device which is used as a precision pipette and ejects a liquid which is a sample. Furthermore, as the liquid consumption device, a liquid consumption device which ejects lubricating oil in a pinpoint manner into precision machinery such as a timepiece or a camera, a liquid consumption device which ejects a transparent resin liquid, such as a ultraviolet curing resin for forming a small semispherical lens (an optical lens) used in an optical communication element or the like, onto a substrate, or a liquid consumption device, which ejects an etching liquid such as an acid or an alkali for etching onto a substrate or the like, may be adopted.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A liquid consumption device comprising:
a print head;
a replaceable liquid container configured and arranged to supply liquid to the print head;
a sensor configured to detect whether or not the liquid in the liquid container has reached a predetermined amount;
a fault finding section configured to find whether there is a fault in the sensor;
an estimation section configured to calculate an estimated value of a consumption amount of the liquid in the liquid container based on an amount of liquid discharged from the print head; and
a determination section configured to determine whether or not the liquid has reached the predetermined amount,
wherein the determination section is configured to carry out determination based on the estimated value of the liquid container which is currently mounted in the liquid consumption device and a threshold value which is specified based on threshold value information when a fault in the sensor has been found, and
the determination section is configured to carry out the determination based on the sensor when a fault in the sensor has not been found and to calculate the threshold value information based on the estimation value when the sensor detects that the liquid has reached the predetermined amount.

2. The liquid consumption device according to claim 1, wherein
the threshold value information is calculated based on a ratio of the estimated value when the sensor detects that the liquid in the liquid container has reached the predetermined amount and a theoretical value of the consumption amount of the liquid when the liquid in the liquid container has reached the predetermined amount.

3. The liquid consumption device according to claim 2, wherein
the determination section is configured to evaluate a statistical value of the ratio as the threshold value information, and
the determination section is configured to set the threshold value, based on a value where the theoretical value of the consumption amount of the liquid when the liquid has reached the predetermined amount is divided by the threshold value information, when a fault in the sensor has been detected.

4. The liquid consumption device according to claim 1, wherein
in a case where the liquid container is replaceable with liquid containers having different capacities, and the liquid container with a different capacity from a reference liquid container is currently mounted in the liquid consumption device,
the determination section is configured to carry out the determination when a fault in the sensor has been found based on the threshold value and the estimated value of the liquid container with the different capacity by calculating the threshold value which is applied to the liquid container with the different capacity based on a ratio of a theoretical value of the consumption amount of the liquid, when the liquid in the liquid container with the different capacity has reached the predetermined amount, and a theoretical value of the consumption amount of the liquid, when the liquid in the reference liquid container has reached the predetermined amount, and threshold value information of the reference liquid container, and
the determination section is configured to carry out the determination based on the sensor when a fault in the sensor has not been found and to calculate the threshold value information of the reference liquid container based on the estimated value when the sensor detects that the liquid in the liquid container with the different capacity has reached the predetermined amount and the ratio of the theoretical value of the consumption amount of the liquid, when the liquid in the liquid container with the different capacity has reached the predetermined amount, and the theoretical value of the consumption amount of the liquid, when the liquid in the reference liquid container has reached the predetermined amount.

5. The liquid consumption device according to claim 4, wherein
in a case where the liquid container with the different capacity is currently mounted in the liquid consumption device,
the determination section is configured to evaluate, as the threshold value information, a statistical value based on a value where a correction value, where the theoretical value of the consumption amount of the liquid when the liquid in the reference liquid container has reached the predetermined amount is divided by the theoretical value of the consumption amount of the liquid when the liquid on the liquid container with the different capacity has reached the predetermined amount, is multiplied with the estimated value when the sensor detects that the liquid in the liquid container with the different capacity has reached the predetermined amount and based on the estimated value when the sensor detects that the liquid in the reference liquid container has reached the predetermined amount, and the determination section is configured to set the value where the threshold value information is divided by the correction amount as the threshold value when a fault in the sensor has been found.

6. The liquid consumption device according to claim 1, wherein
the determination section is configured to evaluate a statistical value of the estimated value when the sensor detects that the liquid has reached the predetermined amount as the threshold value information, and
the determination section is configured to set the same value as the threshold value information as the threshold value when a fault in the sensor has been found.

7. The liquid consumption device according to claim 3, wherein
the statistical value is calculated using a weighted averaging method and giving the largest weighting for a value which is most recently added.

8. The liquid consumption device according to claim 1, wherein
a plurality of the liquid containers are provided, and
the determination section is configured to calculate the threshold value information for each of the liquid containers.

9. The liquid consumption device according to claim 1, wherein
the liquid container is replaceable with liquid containers with different capacities, and
the determination section is configured to calculate the threshold value information for each of the liquid containers with different capacities.

10. The liquid consumption device according to claim 1, wherein
the determination section is configured to carry out the determination based on the estimated value and the threshold value when the threshold value information is calculated a predetermined number of times or more.

11. The liquid consumption device according to claim 3, wherein
the ratio is an estimated consumption amount difference percentage, and
the threshold value information is a learned estimated consumption amount difference percentage.

12. A liquid residual determination method using a liquid consumption device, which is provided with a print head, a replaceable liquid container which supplies liquid to the print head, and a sensor which detects whether or not the liquid in the liquid container has reached a predetermined amount, the method comprising:
finding whether there is a fault in the sensor;
calculating an estimated value of a consumption amount of the liquid in the liquid container based on an amount of liquid discharged from the print head; and
determining whether or not the liquid in the liquid container has reached the predetermined amount,
wherein, the determining is performed when a fault in the sensor has been found based on an estimated value of the liquid container which is currently mounted in the liquid consumption device and a threshold value which is specified based on threshold value information, and is performed based on the sensor when a fault in the sensor has not been found and the threshold value information is calculated based on the estimation value when the sensor detects that the liquid has reached the predetermined amount.

* * * * *